(12) United States Patent
Becker et al.

(10) Patent No.: US 8,856,662 B2
(45) Date of Patent: Oct. 7, 2014

(54) COMPANY AND CONTACT INFORMATION SYSTEM AND METHOD

(71) Applicant: Morgan Stanley, New York, NY (US)

(72) Inventors: Carl Becker, West New York, NJ (US);
Christopher Kovel, Montclair, NJ (US);
Anis A. Khwaja, Huntington, NY (US);
Judy Choi, New York, NY (US);
Stephen Michael Sparkes, New York, NY (US); Andrew Crenshaw, South Orange, NJ (US); Nicholas J. Foad, Brooklyn, NY (US); Igor Boguslavsky, Manalapan, NJ (US)

(73) Assignee: Morgan Stanley, New York, NY (US)

( * ) Notice: Subject to any disclaimer, the term of this patent is extended or adjusted under 35 U.S.C. 154(b) by 0 days.

(21) Appl. No.: 13/953,302

(22) Filed: Jul. 29, 2013

(65) Prior Publication Data

US 2013/0317883 A1    Nov. 28, 2013

Related U.S. Application Data

(63) Continuation of application No. 12/715,153, filed on Mar. 1, 2010, which is a continuation of application No. 11/528,487, filed on Sep. 27, 2006, now abandoned.

(60) Provisional application No. 60/724,322, filed on Oct. 6, 2005, provisional application No. 60/721,517, filed on Sep. 27, 2005, provisional application No. 60/721,316, filed on Sep. 27, 2005.

(51) Int. Cl.
*G06F 3/00* (2006.01)

(52) U.S. Cl.
USPC ............................... 715/751; 715/753

(58) Field of Classification Search
USPC .......................................... 715/751, 810, 753
See application file for complete search history.

(56) References Cited

U.S. PATENT DOCUMENTS

| | | | |
|---|---|---|---|
| 5,546,447 | A | 8/1996 | Skarbo et al. |
| 6,338,067 | B1 | 1/2002 | Baker et al. |
| 6,772,146 | B2 | 8/2004 | Khemiani et al. |
| 6,810,383 | B1 * | 10/2004 | Loveland ............... 705/7.13 |
| 7,362,698 | B2 | 4/2008 | Christensen et al. |
| 7,596,386 | B2 | 9/2009 | Yach et al. |
| 7,752,094 | B2 | 7/2010 | Davidson et al. |

(Continued)

OTHER PUBLICATIONS

International Search Report mailed Sep. 20, 2007 in International Application No. PCT/US06/37659.

(Continued)

*Primary Examiner* — Omar Abdul-Ali
(74) *Attorney, Agent, or Firm* — K&L Gates LLP

(57) ABSTRACT

A user interface for providing information regarding a subject company to a user. The user interface may comprise a company tile, which may have an indicator of the subject company. A state of the company tile, such as, for example, its color, may indicate a property of the subject company. The user interface may also comprise a financial information module displaying financial information regarding the subject company, and a subject individual module displaying information regarding a subject individual related to the subject company. According to various embodiments, the user interface may also include a navigation toolbar including a second company tile comprising an indicator of a second company. Selecting the second company tile may cause the second company to become a new subject company.

24 Claims, 19 Drawing Sheets

(56) References Cited

U.S. PATENT DOCUMENTS

| | | |
|---|---|---|
| 7,848,976 B2 | 12/2010 | Jaurez et al. |
| 8,126,960 B2 | 2/2012 | Obradovich et al. |
| 8,214,749 B2 | 7/2012 | Feinberg et al. |
| 2002/0095362 A1* | 7/2002 | Masand et al. .................. 705/35 |
| 2002/0147502 A1 | 10/2002 | Price et al. |
| 2003/0041333 A1 | 2/2003 | Allen et al. |
| 2004/0117843 A1* | 6/2004 | Karaoguz et al. ............. 725/108 |
| 2005/0114241 A1* | 5/2005 | Hirsch et al. ................... 705/35 |
| 2005/0163104 A1 | 7/2005 | Christensen et al. |
| 2005/0171881 A1 | 8/2005 | Ghassemich et al. |
| 2006/0200459 A1* | 9/2006 | Ohnemus et al. ................. 707/5 |
| 2007/0064682 A1 | 3/2007 | Adams et al. |
| 2008/0263473 A1 | 10/2008 | Becker et al. |
| 2010/0223082 A1 | 9/2010 | Becker et al. |

OTHER PUBLICATIONS

Office Action mailed Nov. 30, 2012 in U.S. Appl. No. 12/715,153.

\* cited by examiner

FIG. 3

QuickView: ACME, Incorporated (Formerly K-III)  Quotes: ACME.N  L: 4.2  Open: 4.34 Chg:  % Chg:

| ACME.N | Smith, J | Smith, J | Smith, J | Smith, J | Smith, J | Smith, J | Smith, J |
| --- | --- | --- | --- | --- | --- | --- | --- |
| | Smith, J | Smith, J | Smith, J | Smith, J | Smith, J | Smith, J | Smith, J |

Show All Contacts

All Company Contacts

| COMPETITOR | | | |
| --- | --- | --- | --- |
| Comp 1 | Comp 2 | Smith, J<br>123 First Avenue,<br>Newyork, NY 12345<br>Business: (000) 000-0000<br>Email: smithj@acme.com | Smith, J<br>123 First Avenue,<br>Newyork, NY 12345<br>Business: (000) 000-0000<br>Email: smithj@acme.com |
| Comp 1 | Comp 2 | Smith, J<br>123 First Avenue,<br>Newyork, NY 12345<br>Business: (000) 000-0000<br>Email: smithj@acme.com | Smith, J<br>123 First Avenue,<br>Newyork, NY 12345<br>Business: (000) 000-0000<br>Email: smithj@acme.com |
| Comp 1 | Comp 2 | Smith, J<br>123 First Avenue,<br>Newyork, NY 12345<br>Business: (000) 000-0000<br>Email: smithj@acme.com | Smith, J<br>123 First Avenue,<br>Newyork, NY 12345<br>Business: (000) 000-0000<br>Email: smithj@acme.com |
| Comp 1 | Comp 2 | Smith, J<br>123 First Avenue,<br>Newyork, NY 12345<br>Business: (000) 000-0000<br>Email: smithj@acme.com | Smith, J<br>123 First Avenue,<br>Newyork, NY 12345<br>Business: (000) 000-0000<br>Email: smithj@acme.com |
| | | Smith, J<br>123 First Avenue,<br>Newyork, NY 12345<br>Business: (000) 000-0000<br>Email: smithj@acme.com | Smith, J<br>123 First Avenue,<br>Newyork, NY 12345<br>Business: (000) 000-0000<br>Email: smithj@acme.com |

ACME.N 8888.T

Active Call: 9082853887 0:00:12 ✕

Carol McDonald
ACME COMPUTER
Chief Executive Officer
+1 908 285-3887

1118 — 🔍 Change Caller
1120 — ✉ Email Caller

⊟ Details —1116
Upcoming Meetings 1126 1128 — 📓 Interaction Journal

| | | | |
|---|---|---|---|
| | Conference Call | Woo, Martin | 09/28/05 |
| | Presentation | Smith, Ellen | 09/21/05 |
| | Meeting with Jane | Brighton, Bill | 09/20/05 |
| | Product Review | Hardy, Tom | 09/19/05 |
| | Email | Johnson, Joe | 09/17/05 |

Recent Interactions —1130

| | | | |
|---|---|---|---|
| ☎ | Conference Call | Woo, Martin | 09/28/05 |
| ☎ | Presentation | Smith, Ellen | 09/21/05 |
| | Meeting with Jane | Brighton, Bill | 09/20/05 |
| | Product Review | Hardy, Tom | 09/19/05 |
| ✉ | Email | Johnson, Joe | 09/17/05 |

Company Information Stock Price: $43.48 -0.32 (0.73%)

| | |
|---|---|
| Acme announces video Pod | 08/31/05 |
| Switch to Intel | 08/30/05 |
| U2 demo latest version of GarageBand | 08/28/05 |
| Pod's Dominance Is Risky Business | 08/14/05 |
| Acme vPod Concept Hasn't Ripened Yet | 08/12/05 |

⊟ Log Call Notes —1119

Subject: [                                      ] —1136

[                                            ]
[                                            ] —1138

💾 Log to CRM    ✕ Close

COMPANY AND CONTACT INFORMATION SYSTEM AND METHOD

CROSS-REFERENCE TO RELATED APPLICATIONS

This application is a continuation of co-pending U.S. patent application Ser. No. 12/715,153, filed on Mar. 1, 2010, which is incorporated herein by reference in its entirety and is a continuation of U.S. patent application Ser. No. 11/528,487, filed on Sep. 27, 2006, which is incorporated herein by reference in its entirety and claims the benefit of U.S. Provisional Application No. 60/721,316, filed on Sep. 27, 2005, which is incorporated herein by reference in its entirety; U.S. Provisional Application No. 60/721,517, filed on Sep. 27, 2005, which is incorporated herein by reference in its entirety; and U.S. Provisional Application No. 60/724,322, filed on Oct. 6, 2005, which is incorporated herein by reference in its entirety.

BACKGROUND OF THE INVENTION

Professionals in the financial services industry must amalgamate large quantities of information from a variety of sources. For example, to effectively serve a client company, an investment banker must be intimately familiar with the financials of the client company, the financials of the client company's competitors, market trends regarding the client company and its competitors, news items regarding the client company and its competitors, etc. In addition, the investment bankers and other financial professionals should be aware of their firm's contacts with particular individuals within the client company, including contacts involving colleagues. This need may be especially acute when the financial professional receives a communication, such as a telephone call or e-mail from a client or other contact.

Currently, financial professionals must gather necessary information, if at all, from various reports, newspapers, trade journals, television programs, and even by word of mouth from colleagues. Accordingly, there is a need for systems and methods for presenting company and contact information to financial professionals in an easily navigated format allowing the financial professional to quickly and efficiently access necessary information.

SUMMARY

In one general aspect, embodiments of the present invention are directed to a user interface for providing information regarding a subject company to a user. The user interface may comprise a company tile, which may have an indicator of the subject company. A state of the company tile, such as, for example, its color, may indicate a property of the subject company. The user interface may also comprise a financial information module displaying financial information regarding the subject company, and a subject individual module displaying information regarding a subject individual related to the subject company. According to various embodiments, the user interface may also include a navigation toolbar including a second company tile comprising an indicator of a second company. Selecting the second company tile may cause the second company to become a new subject company.

BRIEF DESCRIPTION OF THE FIGURES

Embodiments of the present invention are described below by way of example in conjunction with the following figures, wherein:

FIGS. 1-7 are screen shots illustrating a user interface according to various embodiments;

FIGS. 11A-11G are screen shots illustrating various user interfaces according to various embodiments;

DETAILED DESCRIPTION OF THE INVENTION

As used herein the term "user" shall refer to any individual utilizing a user interface. Non-limiting examples of users may include investment bankers, other financial services professionals, administrative assistants of investment bankers and other financial services professionals, etc.

Figure 1:

FIG. 1 shows a screen shot of a user interface 100 that may be served to a user according to various embodiments of the present invention. The interface 100 may provide the user with information regarding a particular individual related to a client company as well as the client company itself. In various embodiments, the client company and individual may be selected by the user. Also, in various embodiments, the client company and individual may be selected automatically, for example, in response to a phone call, e-mail, instant message, etc. from the individual or other person at the client company. The interface 100 may also allow the user to navigate between modules directed to different information about the individual, different individuals and even different companies. The user may access the interface 100, for example, by launching an application on his or her computer.

The user interface 100 is shown divided into a series of modules with each module providing information and/or navigational tools to the user. For example, module 102, located in the upper left of interface 100, includes a company tile 103. The company tile 103 may include an indicator of a company. The indicator may be, for example, the company's name, an abbreviation of the company's name, a ticker symbol for the company, etc. In various embodiments, the company indicated at company tile 103 may be a subject company, with the other modules included in the interface 100 conveying information about the subject company and/or individuals or companies related to the subject company.

In one non-limiting embodiment, the color of the company tile 103 may convey information regarding the subject company including, for example, a change in the company's stock price. In various embodiments, the tile 103 may include a first predetermined color, such as, for example, green, if the company's stock price has risen since the most recent opening of the relevant market. The tile 103 may include a second predetermined color, such as, for example, red, if the company's stock price has fallen since the most recent opening of the relevant market. It will be appreciated that different color shades may be used to indicate different degrees of rise or fall in the subject company's stock price. It will also be appreciated that the tile 103 may, in various embodiments, convey other information about the subject company. For example the tile 103 may be configured to blink and/or display a predetermined color in the event of breaking news regarding the company including, for example, an earnings report, a new research report, a new news story relevant to the subject company, etc.

Title module 108 may show additional information about the subject company including, for example, a name, ticker symbol, former names, former ticker symbols, etc. At field 110, title module 108 may show a brief summary of the subject company's stock price. For example, field 110 may show whether the price has risen or fallen since the most recent opening of the relevant market, the stock's most recent opening price, the change in the stock's price since the most recent opening, the percentage change since the most recent opening, etc.

Module 112 may include financial information regarding the subject company and related companies. The related companies may include competitors of the subject company, subsidiaries of the subject company, strategic partners of the subject company, etc. Related companies may be predetermined based on the subject company, or in one non-limiting embodiment, may be chosen by the user. In FIG. 1, module 112 shows a share price, a market capitalization, a price-earnings ratio (PIE), an earnings before interest, taxes, depreciation and amortization (EBITDA), a net income, and an indicator for the subject company and each related company. It will be appreciated, however, that any financial information about the various companies may be included in module 112. The financial information about the related companies included in module 112 may be obtained from any of a number of sources. For example, in various non-limiting embodiments, the financial information may be obtained from an outside vendor such as, for example, THOMSON.

Figure 6:
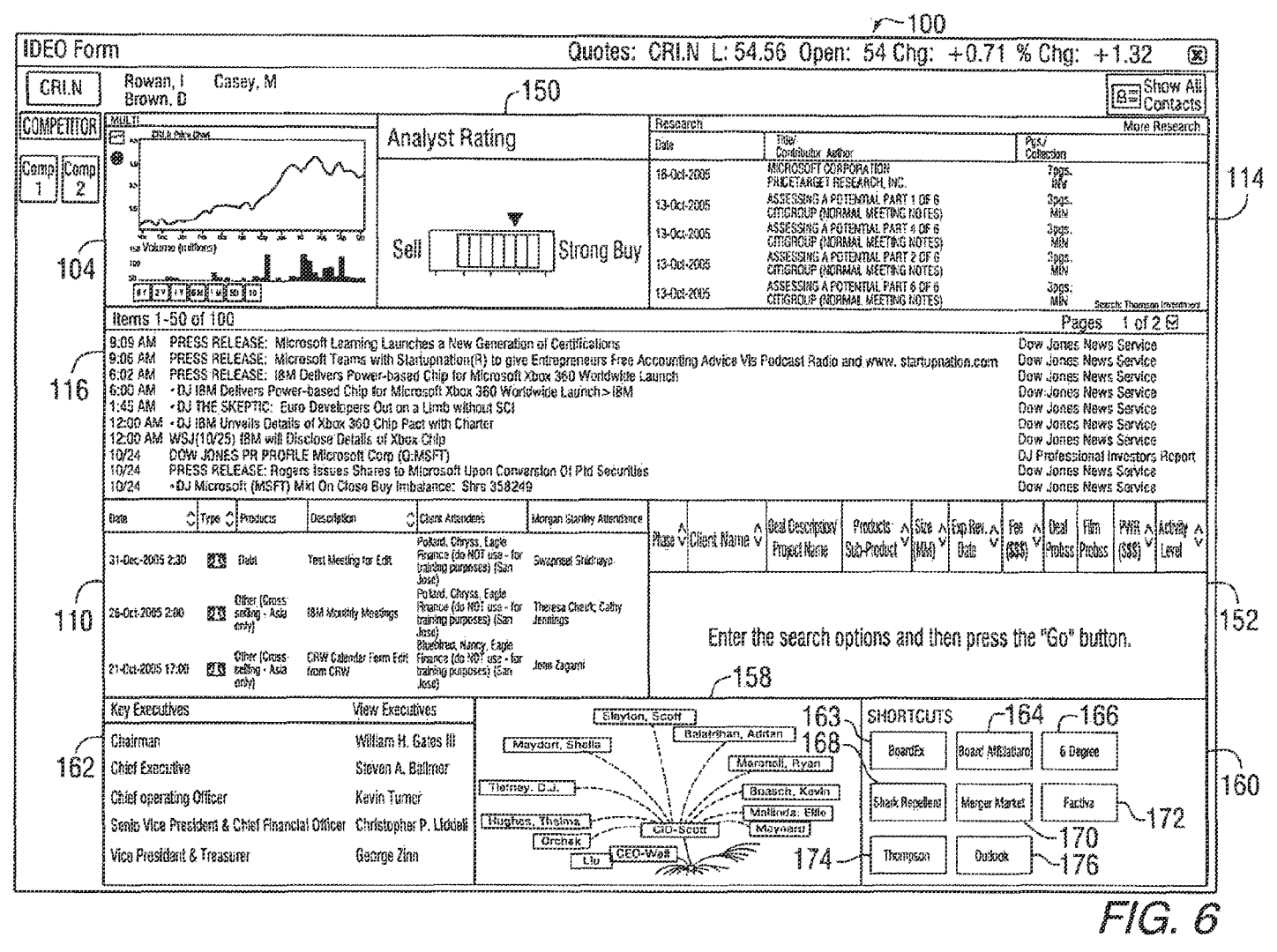

Module 114 may list recent research reports issued regarding the subject company and or related companies. Various details of the research reports may be listed, including, for example, a date, a title and a length of each. In one non-limiting embodiment, the user may be able to access a particular research report by selecting the listing of the report in module 114. FIG. 6 shows the module 114 according to another non-limiting embodiment where an author and collection for each research report are also provided. Research reports listed in module 114 may be provided by various sources including, for example, THOMSON.

Figure 4:
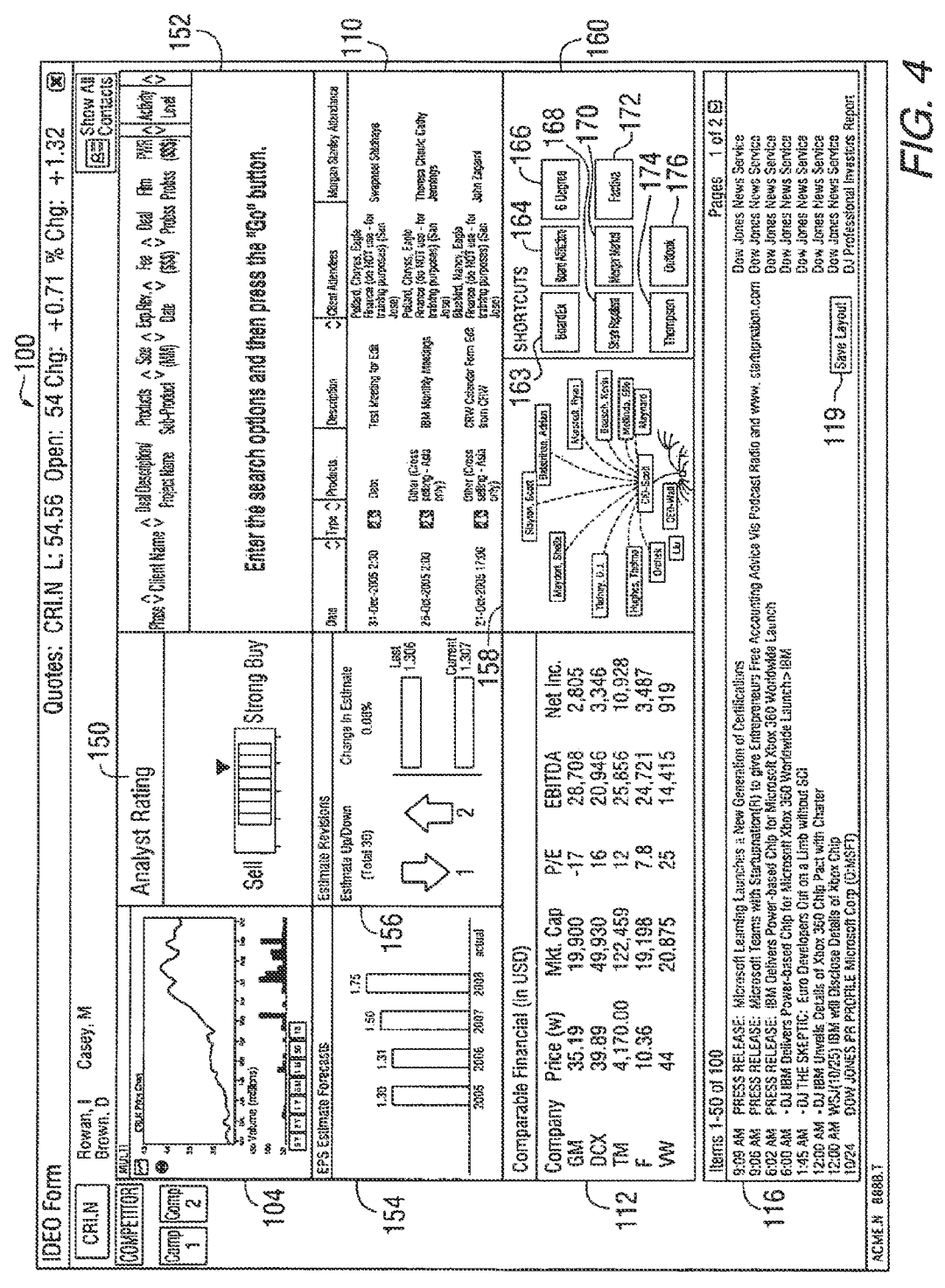
Figure 5:
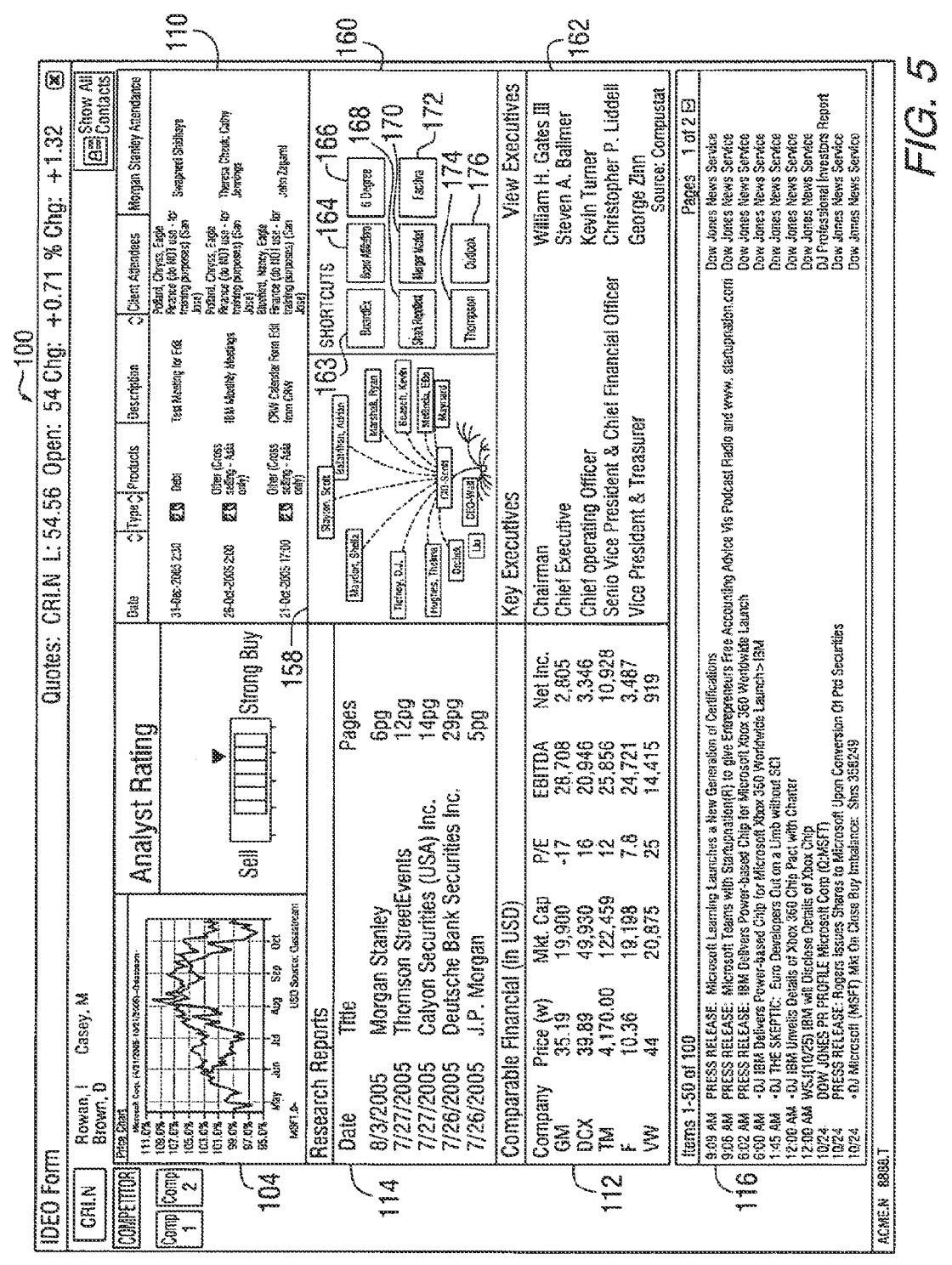

Referring back to FIG. 1, module 116 may include indicators of news stories related to the subject company and/or related companies. The indicators of the news stories may be the headlines of the stories. In one non-limiting embodiment, multiple stories may be organized and listed by category. The number of news stories under each category may also be listed. Selecting an indicator of a news story, for example, by moving a cursor over the indicator and clicking, may allow the user to access the story. FIGS. 4 and 5 show the module 116 according to non-limiting embodiments where the originating news service for each story is also listed.

Module 104 is shown in FIG. 1 to display information about a subject individual related to the subject company. For example, the subject individual may be an employee of the subject company, an analyst who frequently writes research reports regarding the subject company, etc. Module 104 includes the subject individual's name, title, and contact information, but may include other information about the subject individual in addition to or instead of the information shown in FIG. 1. In various embodiments, the individuals name, title, contact information, etc., may be provided by a CRM database, such as CRM database 514 described below.

Figure 2:
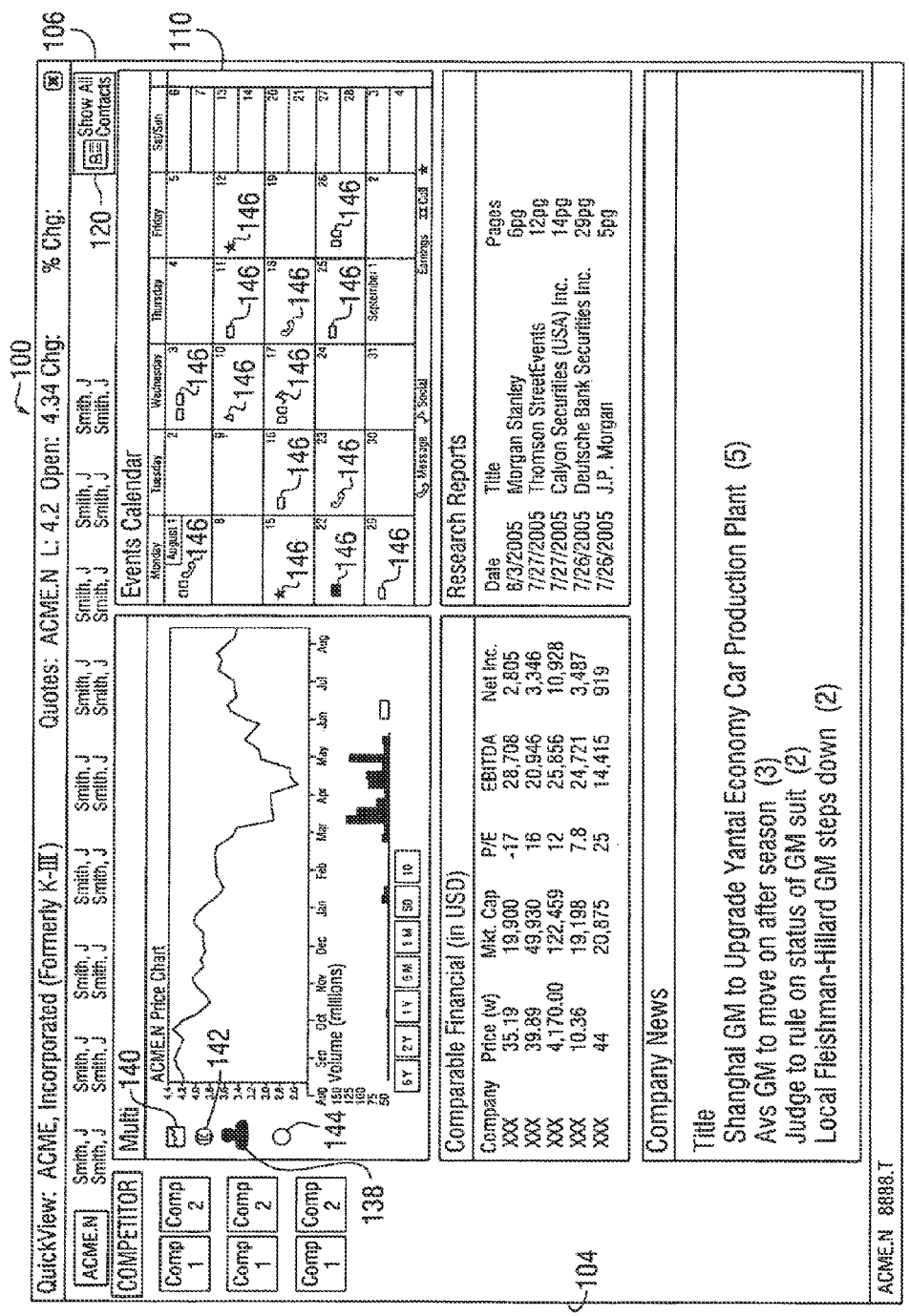

Module 104 may also include navigational buttons, such as 138, 140, 142, 144. Selecting navigation button 140 may cause the module 104 to enter a graph configuration, showing a graph or graphs of financial information regarding the company, for example, as shown in FIG. 2. The graph or graphs may show any financial variable relevant to the subject company including, for example, stock price, trading volume, etc., over any desired time period. The graph or graphs may also be configured according to any suitable setup. For example, FIG. 2 shows the module 104 including a graph of absolute stock price and FIG. 5 shows the module 104 including a graph of relative stock price. In one non-limiting embodiment, the financial variables shown by the graph may be selected by the user.

Selecting telephone navigation button 142 may cause the module 104 to show a history of telephone calls to or from the subject individual over a predetermined timeframe. Telephone calls involving the user may be shown, as well as telephone calls involving the user's colleagues, e.g., fellow employees of the firm, etc. A meeting navigation button 144 may allow the user to see a history of face to face meetings with the subject individual over a predetermined time period, including meetings involving the user and meetings involving the user's colleagues. A contact information button 138, when selected, may cause the module 104 to return to the view shown in FIG. 1. It will be appreciated that module 104 may include various other configurations in addition to, or instead of those shown here.

An events calendar module 110, also shown in FIG. 1, may include representations of upcoming events involving the subject company and/or the subject individual, including events with the user as well as events with the user's colleagues and/or the entire firm. As shown in FIG. 1, the module 110 may form a grid indicating various dates. The grid may be configured according to any suitable style. For example, FIG. 1 shows a grid including three months. FIG. 2 shows the module 110 with a grid including a traditional one-month view. In various embodiments, the module 110 may include a listing of events rather than a grid, for example, as shown in FIGS. 4-5.

Icons 146 may be located on the grid at the various dates and/or on the list and may represent scheduled events. Non-limiting examples of events represented by icons 146 include, earnings events relating to the subject company or related companies, firm-wide meetings with the subject individual or company, smaller conferences with the subject individual or company, industry conferences, non-earnings related calls or events (e.g., merger and acquisition calls), shareholder meetings of the subject company and/or related companies, the release of major reports by the subject company and/or related companies, etc. In various embodiments, icons 146 may also represent scheduled e-mail messages, internal meetings within the firm regarding the subject company, and firm-sponsored events to be attended by the client. In one non-limiting embodiment, the field 110 may include only events in the future, however, it will be appreciated that past events may be shown as well.

According to various embodiments, the user may change the subject individual reflected in module 104 and/or module 110 at module 106. The module 106 may include the names of various individuals related to the subject company. For example, the module 106 may list executives of the company, officers of the company, other employees of the company, etc. In one non-limiting embodiment non-employees of the company may also be listed in module 106 including, for example, analysts who frequently issue reports on the company or other individuals that the user may contact regarding the subject company.

The user may be able to customize the names shown at module 106, for example, by selecting the Show All Contacts button 120. Selecting button 120 may cause the interface 100 to display an All Company Contacts module 148. The All Company Contacts module 148 may include the names and contact information, for example, of all individuals related to the subject company that are known to the firm. The user may add a contact from the All Company Contacts module 148 to the module 106, for example, by clicking and dragging the contact from module 148 to module 106. Similarly, the user may remove a contact from module 106, for example, by clicking and dragging the contact from module 106.

Referring back to FIG. 1, the interface 100 may include a related company navigation module 109. The module 109 may include related company tiles 122, 124, 126, 128, 130, 132, similar to the subject company tile 103 described in module 102 above. Each related company tile 122, 124, 126, 128, 130, 132 may include an indicator of a related company. The related companies having company tiles included in module 109 may be predetermined, or may be selected and/or modified by the user. It will be appreciated that various information about the related companies may be indicated by the company tiles 122, 124, 126, 128, 130, 132. For example, the color and/or state of the tiles may indicate the direction that the related company's stock price has moved since the most recent opening of the relevant market, as described above with respect to tile 103. The user may reconfigure the interface 100 to cause one of the related companies indicated by company tiles 122, 124, 126, 128, 130, 132 to become a new subject company by selecting one of the tiles. For example, the various modules 102, 104, 106, 108, 109, 110, 112, 114, 116, etc. may be repopulated with new information based on the new subject company.

A history tool bar 118 may include company tiles 134, 136 including indicators of recent subject companies of the interface 100. The tiles 134, 136 may be similar to the tile 103 described above. For example, various information about the recent subject companies may be indicated by the color and/or state of the tiles 134, 136. The user may cause one of the recent subject companies to become a new subject company by selecting its corresponding tile 134, 136. This may cause the various modules 102, 104, 106, 108, 109, 110, 112, 114, 116, etc., to be repopulated with new information based on the new subject company.

Various embodiments of the user interface 100 may include an analyst rating module 150, for example, as shown in FIGS. 4-6. The analyst rating module 150 may indicate a rating given to the subject company. For example, the subject company may receive a "sell" rating if its outlook is poor and a "buy" rating if its outlook is positive. The rating may be indicated in module 150 textually or graphically. For example, as shown in FIGS. 4-6, a continuum of ratings is indicated by a grid, with an arrow indicating the subject company's location on the continuum.

FIGS. 4 and 6 also show a deal track module 152 according to various embodiments. The deal track module 152 may include information about particular sales, purchases or offerings that the subject company is considering. For example, the deal track module 152 may list information about financial products that the user's firm is currently preparing. Information about the financial product may include, the phase of the project, the client name, a description of the deal or project name, the size of the project, the expected revision date of the project, the fee to the firm for the project, the probability of the deal being completed, the probability that the firm will land the deal, the amount of current activity on the deal, etc. The types of products or projects listed at the deal track module 152 may include, for example, debt or equity offerings, mergers and acquisitions, tax products, certificates of deposit, real estate purchases, etc. In various embodiments, the deal track module 152 may support searching. For example, a user may enter criteria describing a deal. A deal or deals, if any, that match the criteria may be found and displayed at deal track module 152.

In various embodiments, the interface 100 may include an estimate forecast module 154, for example, as shown in FIG. 4. The estimate forecast module may show estimated parameters describing the subject company over one year or a multi-year period. For example, the module 154 shown in FIG. 4 shows earnings estimates for the subject company over a four year period. The estimate revisions module 156 may show changes in estimates regarding the subject company. For example, the module 156 shown in FIG. 4 indicates that of three total estimates, two have risen while one has fallen. Also, the current and a previous estimate are shown.

FIGS. 4-6 also show a relationship module 158, according to various embodiments. The relationship module 158, which may also be referred to as a six degrees module, may graphically represent relationships between individuals. Information representing the relationships may be obtained, for example, from a Customer Relationship Management (CRM) database. The individuals listed in the relationship module 158 may include, for example, officers, employees, analysts of, and others associated with the subject company, as well as colleagues of the user within the user's firm or other organization.

FIGS. 4-6 also show a shortcuts module 160, according to various embodiments. The shortcuts module 160 may include a series of buttons 163, 168, 170, 172, 174 and 176. Each of the buttons may correspond to a particular item such as a module, application, web-site, etc. Selecting one of the buttons 163, 164, 166, 168, 170, 172, 174 and 176 causes its corresponding item to launch either within a module of the user interface 100 or in a full-screen mode. It will be appreciated that some buttons, such as, for example, 163, 168, 170, 172, and 174 may correspond to third party vendor products such as, for example, BOARDEX, SHARK REPELLENT, MERGER MARKET, FADIVA, THOMSON and MICROSOFT OUTLOOK. Other buttons, such as 164 and 166, may correspond to a module. For example, selecting button 164 may launch a screen allowing the user to enter and/or view raw data used to generate the relationship module 158. Selecting button 166 may launch the relationship module 158. In various embodiments, if the relationship module 158 is not present in the user interface 100, selecting the button 166 may cause it to appear within the interface 100 either as a replacement for a previously displayed module or as an additional module. If the relationship module 158 is already present in the user interface 100, selecting the button 166 may cause the relationship module 158 to appear in a full-screen mode.

FIGS. 5 and 6 show the user interface 100 configured to include a key executives module 162. The key executives module 162 may list a number of the executives of the subject company. For example, embodiments of the key executives module 162 shown in FIGS. 5 and 6 list the chairman, chief executive, chief operating officer, chief financial officer, and vice president & treasurer of the subject company. Selecting a position or individual from the module 162 may cause that individual to become the subject individual displayed at the module 104. It will be appreciated that different companies are organized in different ways with different officers and executives, and therefore the number and titles of individuals listed at module 162 may vary by subject company.

It will be appreciated that the various modules 102, 103, 104, 106, 108, etc. may be arranged within the user interface 100 according to various layouts. For example, FIGS. 1, 2, 3, 4, 5, and 6 each show a different layout of modules within the interface 100. Also, not every module will appear in every layout of the interface 100. For example, the relationship module 158 is not shown in FIG. 1, 2 or 3. In various embodiments, the user may save a particular layout or arrangement of modules within the interface 100, for example, by selecting the save layout button 119 shown in FIG. 4.

Figure 7:
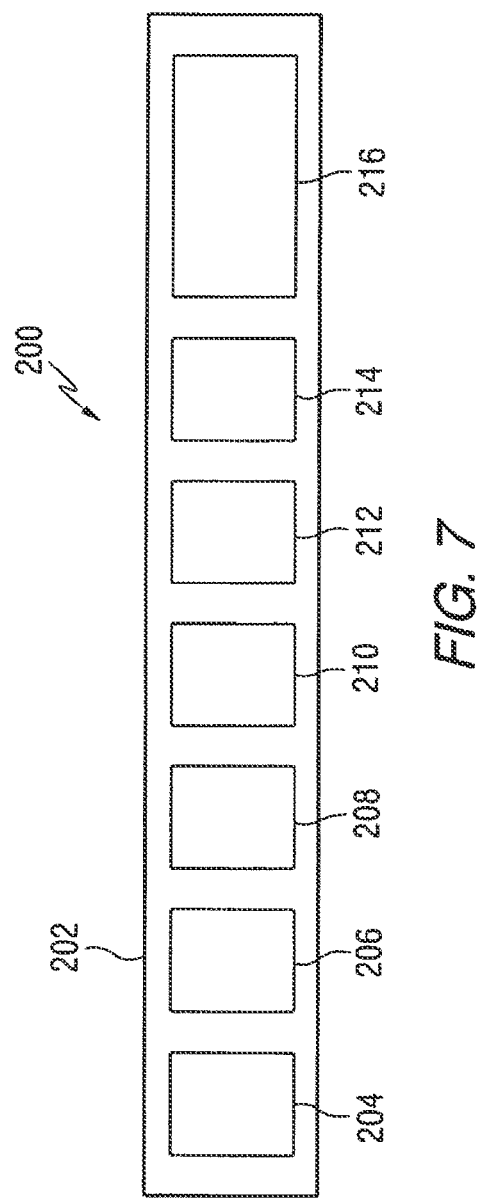

FIG. 7 shows an additional user interface 200 that may interact with the user interface 100 according to various embodiments. The user interface 200 may be implemented as a stand-alone interface, shown in FIG. 7, or in various embodiments, may be implemented as a module or other component of the interface 100. The user interface 200 may include a toolbar 202. The toolbar 202 may be configured to remain on the user's desktop, for example, while the user is utilizing other applications. The toolbar 202 may include company tiles 204, 206, 208, 210, 212, 214 including indicators of book-marked companies, or companies that the user may deal with frequently. The book-marked companies may initially be predetermined, for example, based to the user's normal work. In various embodiments, the user may be able to add or remove book-marked company tiles to the toolbar 202. When the user selects one of the tiles 204, 206, 208, 210, 212, 214, interface 100 may launch as described above with the company indicated by the selected tile as the subject company. If the interface 100 is already running when one of the tiles 204, 206, 208, 210, 212, 214 is selected, then the company corresponding to the selected tile may become a new subject company of the interface 100.

In various embodiments, the toolbar 202 may also include a new company field 216. The user may select text indicating a company, such as a company name or ticker symbol, from any application and drop it into the new company field 216. The text, for example, may be selected from any kind of document or program including, for example, a web page viewed through a web-browser, a word processing document, a PDF document, etc. Dropping the text into field 216 may trigger a text search identifying the new company. A company tile (not shown) indicating the new company may then be added to the toolbar 202. In one non-limiting embodiment, dropping the text anywhere in the toolbar 202 may trigger the text search identifying the new company and add a new company tile.

Various embodiments of the user interface 100 may provide alerts to the user. The alerts, for example, may make the user aware of current happenings and/or tasks that need to be completed. Alerts may be presented to the user as a pop-up screen or toast that may appear in front of any other applications present on the user's screen. Also, in various embodiments, alerts may appear in or replace a module or other part of an existing interface, (e.g., interface 100). In various embodiments, an alert may also include buttons or other options that allow the user to address the alert.

For example, various embodiments may include a lonely or unattended client alert. The lonely client alert may be implemented in conjunction with a customer relationship management (CRM) application and/or database. A lonely client alert may be generated and presented to a user when the CRM detects that there has been no contact with a particular client for a given amount of time. In various embodiments, the given amount of time may vary by client. For example, lonely client alerts may be generated for different clients after different periods of no contact. In various embodiments, there may be a continuum of clients, with each tier of the continuum corresponding to an allowable no-contact time before a lonely client alert is generated. For example, clients at a first tier may have a lonely client alert generated after 2-3 weeks of no contact, clients at a second tier after 4-5 weeks, and so on. In various embodiments, the interface presenting the alert may include features that allow the user to contact a client that is the subject of a lonely client alert.

Various embodiments may also include a market alert. A market alert may be generated when the market reaches a predetermined set of market conditions. The market conditions may describe the market as a whole, or an individual company. In this way, a user may track the market as a whole, individual client companies, and/or other companies of interest (e.g., competitors of clients, market leaders, etc.). In various embodiments, the predetermined set of conditions may be chosen by a user, or may be generic to multiple users. For example, the interface 100 may include a set of canned market alert criteria common to all users. Individual users, however, may be able to modify and/or supplement the canned market alert criteria. Example market alert criteria include: a change in a company's Standard & Poor's (S&P) rating, a change in a company's Moody's rating, a given change (e.g., 5%) in the implied volatility of a companies stock, the company's share price meets certain criteria (e.g., within 5% of its 12 month high or low), the company has debt that is near maturity (e.g., $100 million or more that matures within 12 months), etc.

A client event alert, according to various embodiments, may be generated when an event with a given client is upcoming. Example events may include meetings, conferences, telephone calls, e-mails, etc. The alert may be generated at various intervals before the event (e.g., a week, a day, an hour, etc.). A board/management change alert may be generated when a change at a company of interest results in a change in its control group (e.g., board of directors, managers, etc.). The companies of interest may be client companies, competitors of client companies, market leaders, etc. In various embodiments, the companies of interest may be predetermined and/or selected by a user.

News alerts may be generated when a new news story is received, for example, the news stories that populate field 116 described above. In various embodiments, when new news stories are received, they are aggregated and de-duplicated. For example, more than one news story covering the same news event or development may be received. News alerts may be configured so that only one news alert is generated per news event, or development. A representative news story may then be presented to a user as a link. In various embodiments, multiple representative news stories may be presented, allowing the user to choose a story to view.

Figure 8:
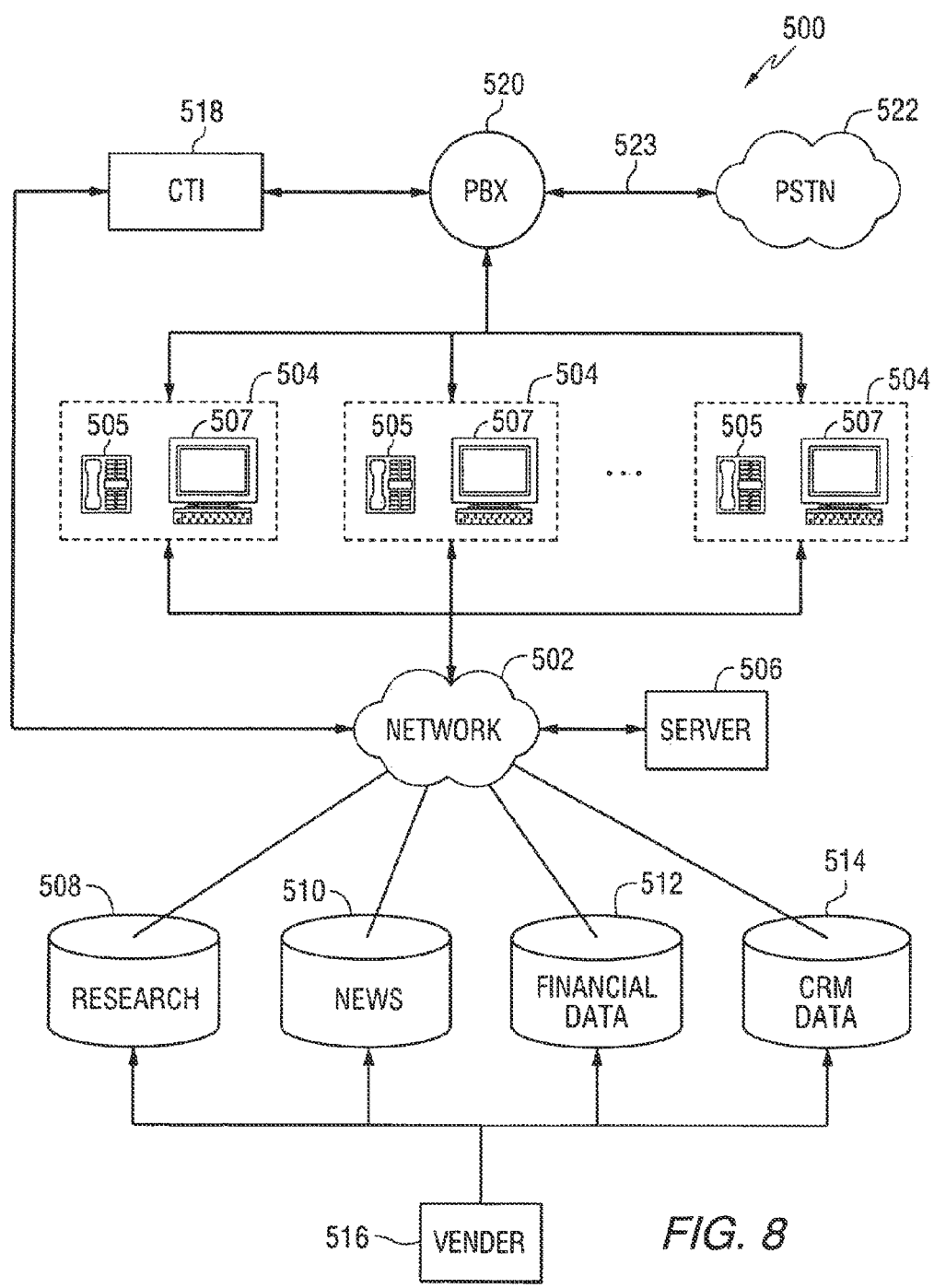
FIG. 8 is a diagram illustrating a system according to various embodiments.

FIG. 8 shows a system 500 for implementing the user interfaces 100, 200 according to various embodiments. The system 500 may include a wired or wireless network 502 that may be a LAN, WAN or any other suitable communications network. The network 502 may facilitate communication between the various other components of the system 500 including, for example, one or more user systems 504. The user systems 504 may be any kind of computer or other device capable of providing user interfaces, such as interfaces 100 and 200. In various embodiments, the user systems 504 may include one or more of a telephone 505, a computer 507, a personal digital assistant (not shown), a cell phone (not shown), etc.

The system 500 may also include one or more servers 506. Servers 506 may execute applications implementing the systems and methods described herein. For example, server 506 may serve the user interface 100 described above to one or more user systems 504. The servers 506 may also provide other user interfaces to users displaying information related to a communication, for example, those described herein below. In various embodiments, the servers 506 may monitor data and generate alerts, where appropriate, maintain and query databases 508, 510, 512, 514, populate interfaces, etc.

Databases 508, 510, 512, 514 may store various information served to the user according to various embodiments. The information may be generated in-house, or, in various embodiments, may be provided by an outside vendor 516. Also, in various embodiments, all or a portion of one or more of the databases 508, 510, 512, 514 may be external to a firm implementing the system 500 and may be accessed via network 502. It will be appreciated that any of the databases 508, 510, 512, 514 may be implemented as one unitary database or as any number of separate individual databases.

Each of the databases 508, 510, 512, 514 may include information provided to the user through interfaces 100, 200. For example, Research Database 508 may include various research reports on potential subject companies that may be displayed to the user, for example, by module 114, and/or monitored and presented in various alerts. News Database 510 may include various news stories regarding potential subject companies that may be displayed to the user, for example, by module 116 and/or monitored and presented in various alerts. Financial Database 512 may include various financial data regarding potential subject companies that may be displayed to the user, for example, by modules 102, 104, 106, 108, etc., and/or monitored and presented in various alerts. A Customer Relationship Management (CRM) database 514 may include contact information for various potential subject individuals as well as information regarding recent and future scheduled contacts with the individuals, for example, shown to the user through module 104, and/or monitored and presented in various alerts. The various databases 508, 510, 512, 514 may be populated by information internal to a firm, or by one or more outside vendors 516.

In various embodiments, the system 500 may also include components for handling communication events. For example, communications to or from a computer 507 or other network-enabled component of the user systems 504 may be transported via the network 502. One or more of the servers 506 may intercept incoming network communications and take appropriate action (e.g., direct the communication to the appropriate user system 504, generate alerts, etc.). Also, in various embodiments, the system 500 may interface with a public switch telephone network (PSTN) 522 through a private branch exchange (PBX) 520. In this way, the system 500 may be able to view and/or manipulate incoming telephone calls. The PSTN 522 may be connected to the PBX 520 via one or more trunk lines represented by line 523. The PBX 520 may route incoming calls received from the PSTN 522 to the appropriate user subsystem 504, for example, a telephone 505 at the appropriate user subsystem 504. The PBX 520 may be any kind of suitable PBX, for example, any PBX available from AVAYA. A computer telephone interface (CTI) 518 may connect the PBX 520 to the network 502. This may allow other components on the network including, for example, the server 506 and computers 507, to manipulate incoming and outgoing calls and take suitable actions. For example, a user may be able to pick up a call, transfer a call, dial a call, etc., based on inputs to his or her computer 507. The CTI 518 may include any suitable combination of hardware and software.

In various embodiments, the system 500 may also be used to handle communications with or from the user, for example, as described below. Example communications may include telephone calls, e-mails, instant messages, etc. It will be appreciated that the communication handling may be implemented in addition to or in conjunction with the various interfaces and alerts described above.

Figure 9:
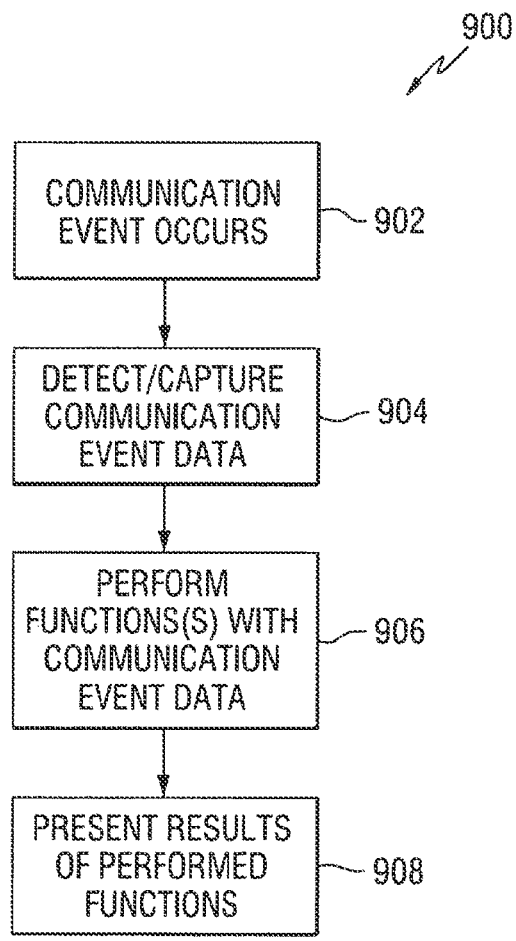
FIGS. 9-10 show flow charts illustrating process flows according to various embodiments.

FIG. 9 shows a process flow 900, according to various embodiments, for handling a communication to a user. At step 902, a communication event occurs. Examples of communication events include, without limitation: calendar reminder events (e.g., such as pop-up reminder screens provided by MICROSOFT OUTLOOK or LOTUS NOTES APIs); incoming and outgoing telephone calls (e.g., as provided by AVAYA computer telephony libraries (DLLs) for use with telephony systems); incoming and outgoing instant messaging events (e.g., as may be provided by the MORGAN STANLEY proprietary "JAM" instant messaging client, or by a MICROSOFT WINDOWS MESSENGER application); and/or by incoming or outgoing video conferencing events (e.g., as provided by use of APIs provided in the ECONF video conferencing client or by the MICROSOFT WINDOWS MESSENGER application).

At step 904, the communication event may be detected and captured. Various components of the system 500 (e.g., servers 506, user systems 504, etc.) may be configured to use various methods to detect communication events. For example, when a communication event is triggered by an e-mail, various application programming interfaces ("APIs") of a particular e-mail application associated with the e-mail may detect and notify appropriate programs about communication events arising from operation of the e-mail application. When an e-mail arrives in a MICROSOFT OUTLOOK e-mail application, the communication event can notify appropriate system 500 components through the use of APIs associated with the e-mail application, that a change representing a communication event (e.g., arrival of an e-mail) has just occurred. When the communication event is a telephone call, the telephone call may be detected through the switch 520 and CTI 518. For example, when a telephone call is received, the switch 520 may be configured to recognize the incoming telephone call as a communication event. As part of the detection and capture process at step 904, the CTI 518 may notify the appropriate server 506 that the telephone is ringing and communicate caller identification data, for example, to one or more components of the user system 504 associated with the called party.

At step 906, the system 500 may use the communication event data captured at step 904 to perform one or more additional functions in accordance with the communication event data. For example, the system 500 may use the communication event data to query various system components, such as databases 508, 510, 512, 514 to retrieve information associated with the communication event data. For example, if the communication event data includes a caller identification for a telephone number, then the system 500 may search the CRM database 514 for a client name associated with the caller identification information. Also, in various embodiments, the system 500 may populate an interface, such as interface 100, with information relating to the communication. For example, the interface 100 may be generated or re-generated with the other party to the communication as the subject individual and the other party's company as the subject company.

At step 908, the system 500 may present the results of the function performed in step 906, for example, by presenting a consolidated portal-like screen display of information collected during a search performed in the CRM database 514. In various embodiments, the display may be a version of the user interface 100 described above, or one of various other user interfaces, for example, as described herein. In various embodiments, the information provided at step 908 may be presented in the form of a pop-up window that automatically disappears after a few seconds, for example, or in the form of a side-bar window that appears on a screen display of the currently active application employed by the user.

In various embodiments, the presentation of the results at step 908 may be personalized for the particular user viewing the information and/or may be customizable by the user, perhaps based on the channel of communication in which the communication event was generated. For example, with respect to an instant message communication event, the user may want to view a smaller subset of client information in comparison to a larger subset of information for a client telephone call, because the user may not have convenient access to use a computer system during a telephone call. Also, the presentation of results can be driven by the particular working style preferences of the user. It can be appreciated, therefore, that the appearance of information push functions employed by the system 500 in presenting results at step 908 may be configurable by the user. In addition, the user may configure how the information push is invoked for a given communication event. For instance, it may be a distraction for certain users to receive pop-up windows for all telephone calls, when most of their work is performed with e-mail and not by using the telephone. Also, the user may want to temporarily suspend display of results for certain communication channels.

It can be seen that various embodiments can provide a targeted push of relevant information to an end user when certain communication events occur. The information displayed may include data drawn from one or more of the databases 514, 512, 510, 508, etc. The content and/or format of information displayed to the end user may depend on one or more factors, including but not limited to, for example: who is in the conversation (internal party and external party); whether the external party is a known contact within the CRM database 514; the kind of communication event (e.g., incoming phone call versus calendar reminder popup); the user's role and location (e.g., sales traders at an investment bank may care about a different set of data than bankers, or different sets of regulations may apply to user in different roles and job functions); and/or, the user's previous reaction to information contained in the information push (e.g., a mechanism or user interface can be provided by the system 500 in the information push that allows the user to change or customize the display of a subsequent information push).

In various embodiments, the system 500 may be configured to automatically execute one or more searches, or initiate retrieval of information, upon occurrence of specific communication events or combinations of communication events. The system 500 may identify and collect characteristics about the party communicating with the firm (e.g., a telephone number in the event of a phone call, an instant messaging address in the event of an instant messaging conversation, a H323/SIP/DID address in the event of a video conferencing call, or an e-mail address in the event of a calendar reminder). These characteristics may serve as inputs to the automated searches or information retrieval processes that can be performed at step 906. The searches may uncover, for example, upcoming meetings with the party, a history of recent e-mails exchanged by the user with the party, and/or, a history of e-mails sent by the party to which the user has not yet replied, etc.

In various embodiments, the system 500 may use local desktop search tools as a way to distribute the burden of automated information retrieval. This allows efficient use of the computing resources of the system 500, because searches can be executed locally as opposed to having multiple desktop computer systems querying a central information service every time a communication event is received. For example, each user system 504 may include, or have access to, all or a portion of the information present at databases 514, 512, 510, 508. Accordingly, each user system 504 may be able to individual perform a query when a communication event directed to that subsystem 910 is received. Also, embodiments of the system 500 may make beneficial use of communication event data to perform programmatic invocation of search technology, including desktop search technology, as a way to retrieve and present relevant customer information to users.

Figure 10:
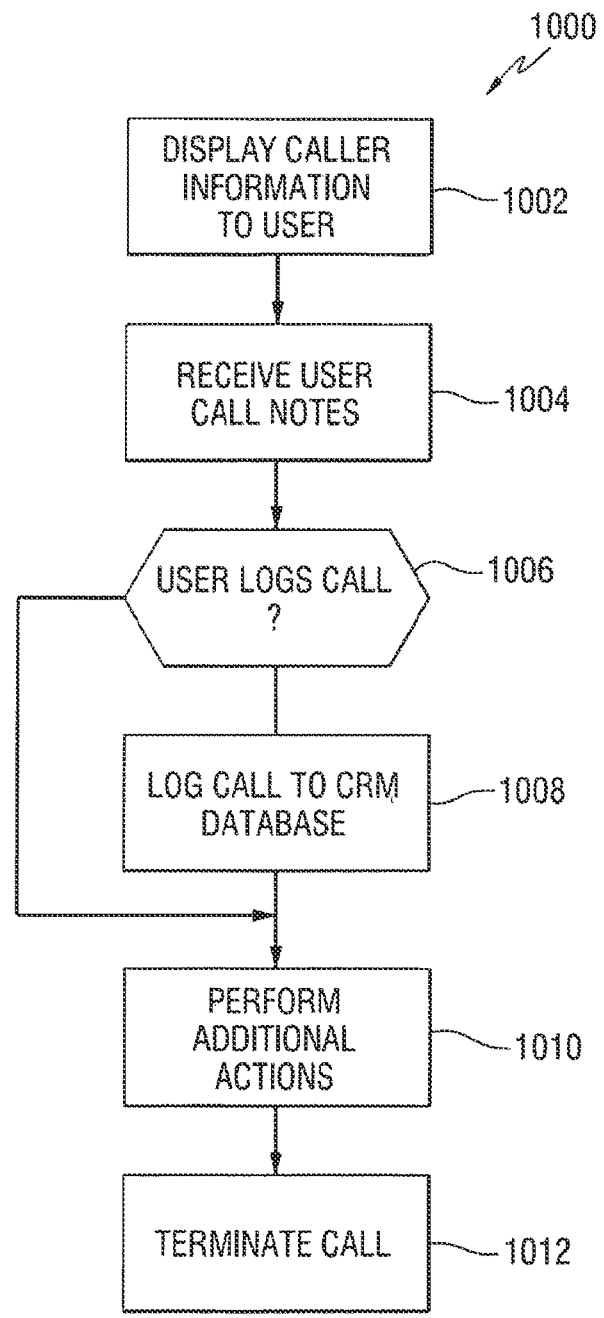

FIG. 10 shows a process flow 1000, according to various embodiments, for handling an incoming phone call to a user. Although the communication event referred to in the process flow 1000 is a telephone call, it will be appreciated that the same or similar steps may be performed for other communication events, (e.g., e-mails, instant messages, etc.) FIGS. 11A, 11B, 11C, 11D, 11E, 11F and 11G show screen shots from a user interface 1100 that may be served to a user to implement the process flow 1000 according to various embodiments. It will be appreciated that the user interface 1100 may be served as the stand alone windows shown in FIGS. 11A-11G. Also, in various embodiments, the user interface 1100 may be served as one or more modules of the interface 100 described above. Referring back to FIG. 10, at step 1002, caller information may be presented to the user. In one non-limiting embodiment, the caller information may be presented in the form of a screen pop or toast.

Figure 11A:
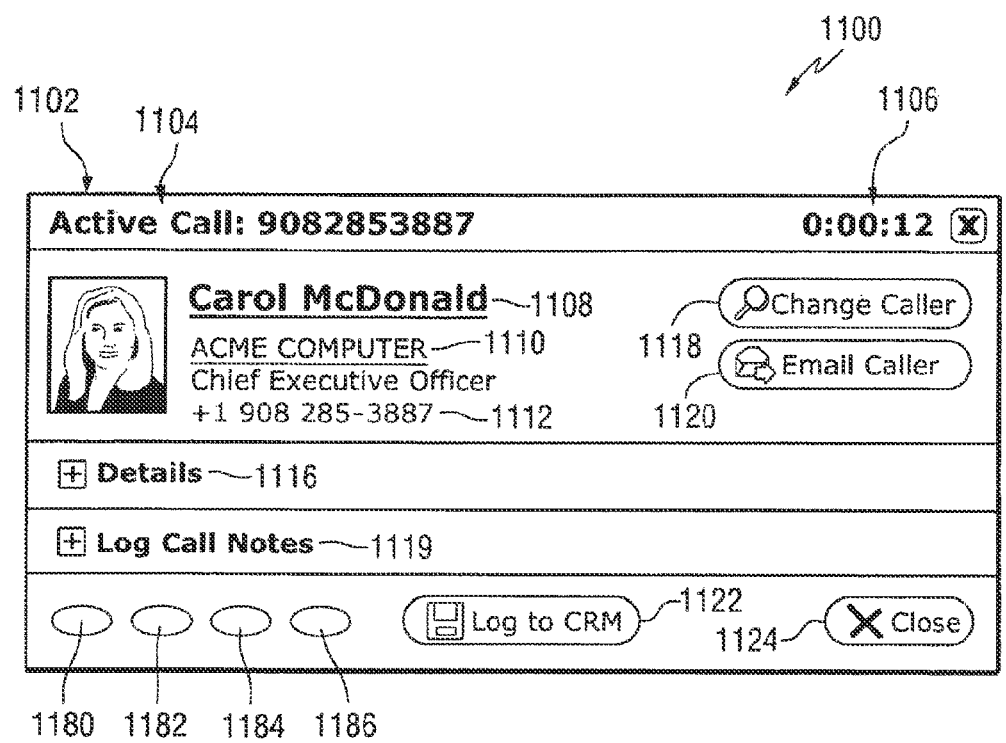

FIG. 11A shows a screen shot of a window 1100 that may present caller information to the user according to various embodiments. The window 1100 may provide information about the caller and the call itself. Information about the call itself may be shown at fields 1102, 1104 and 1106. For example, the status of the call (e.g., active, terminated, etc.) may be shown at field 1102. Also, the number from which the call originated may be shown at field 1104. The duration of the call may be shown at field 1106. Information about the caller may be shown at fields 1108, 1110, 1112, 1114. For example, field 1108 may list the name of the caller, with the caller's company and position listed at field 1110 and telephone number or other contact information listed at field 1112. A picture of the caller, if available, may be shown at field 1114.

In various embodiments, the window 1100 may also include buttons 1180, 1182, 1184, 1186 for controlling the call. For example, selecting a button 1180 may allow the user to transfer the call to another extension. Selecting button 1182 may allow the user to add other users to the call to form a conference call. Selecting button 1184 may allow the user to drop the call. Selecting button 1186 may allow the user to transfer the call to voicemail. Also, button 1120, may allow the user to prepare and send an e-mail to the caller. For example, selecting button 1120 may link the user to an e-mail program including, for example, MICROSOFT OUTLOOK, a web-based e-mail account, etc.

Figure 11C:
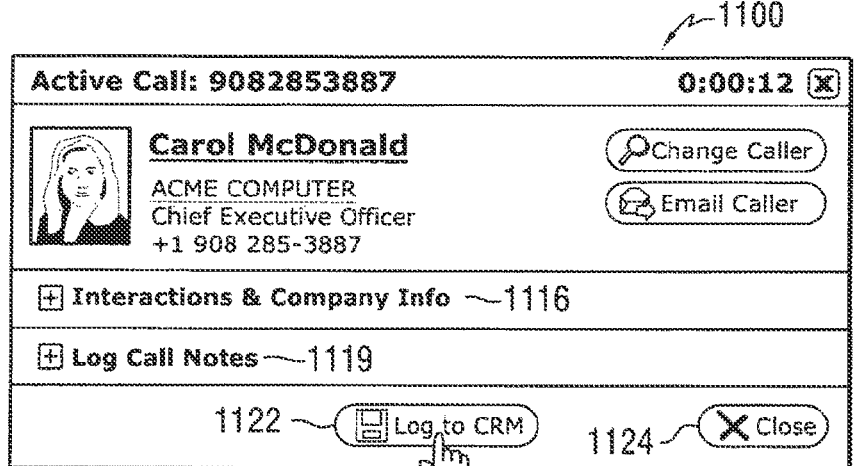

Additional details about the caller may be provided at field 1116, shown collapsed in FIG. 11A. It will be appreciated that field 1116 may be given any suitable title including, for example, "Details" as shown in FIG. 11A, or "Interactions & Company Info" as shown in FIG. 11C. Selecting field 1116 may cause it to expand, as shown in FIG. 11B. When expanded, field 1116 may provide additional details regarding the caller and the caller's company, for example, in Upcoming Meetings field 1126, Recent Interactions field 1130 and Company Information field 1134. The Upcoming Meetings field 1126 may list future scheduled interactions between the caller and various individuals within the firm. The Recent Interactions field 1130 may list past interactions between the caller and individuals at the firm. The fields 1126 and 1130 may list the type of interaction, the individual at the firm with whom the interaction is scheduled, the date of the interaction, and any other pertinent information. Also, it will be appreciated that the caller's scheduled interactions with the user, as well as with other individuals within the firm, may be shown at fields 1126 and 1130. Any type of interaction between the caller and the firm may be listed at fields 1126, 1130 including, for example, telephone calls, face-to-face meetings, e-mails, etc. The user may select button 1128 to view a more comprehensive list of interactions, past and future, with the caller, for example, including more interactions.

The Company Information field 1134 may provide the user with information regarding the caller's company. For example, the company's current stock price, change on the day, and percentage change on the day may be listed. Field 1134 also shows links to various news articles describing the company. It will be appreciated that any information regarding the company may be listed at field 1134 including, for example, earnings, stock price trends, etc.

Figure 11D:
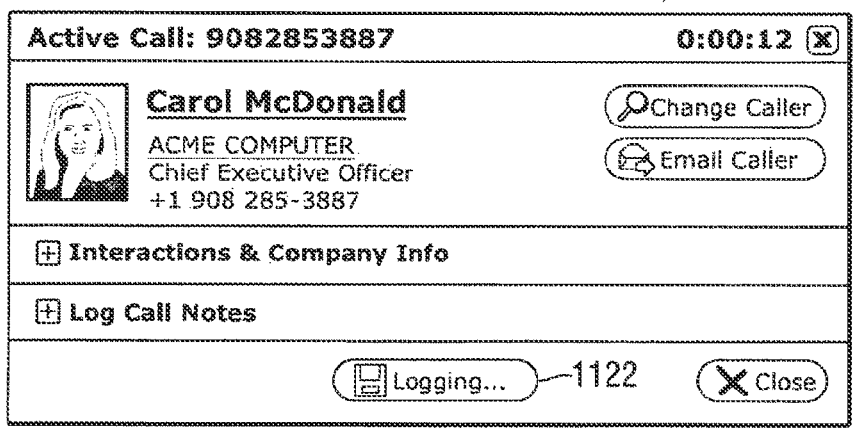
Figure 11E:
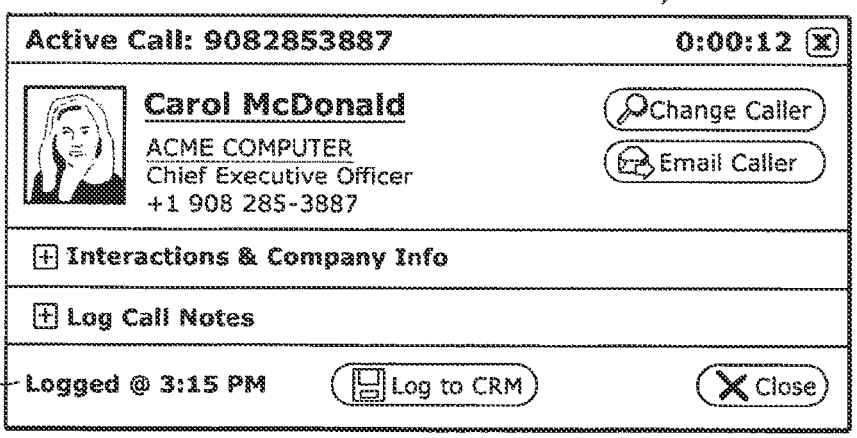
Figure 11F:
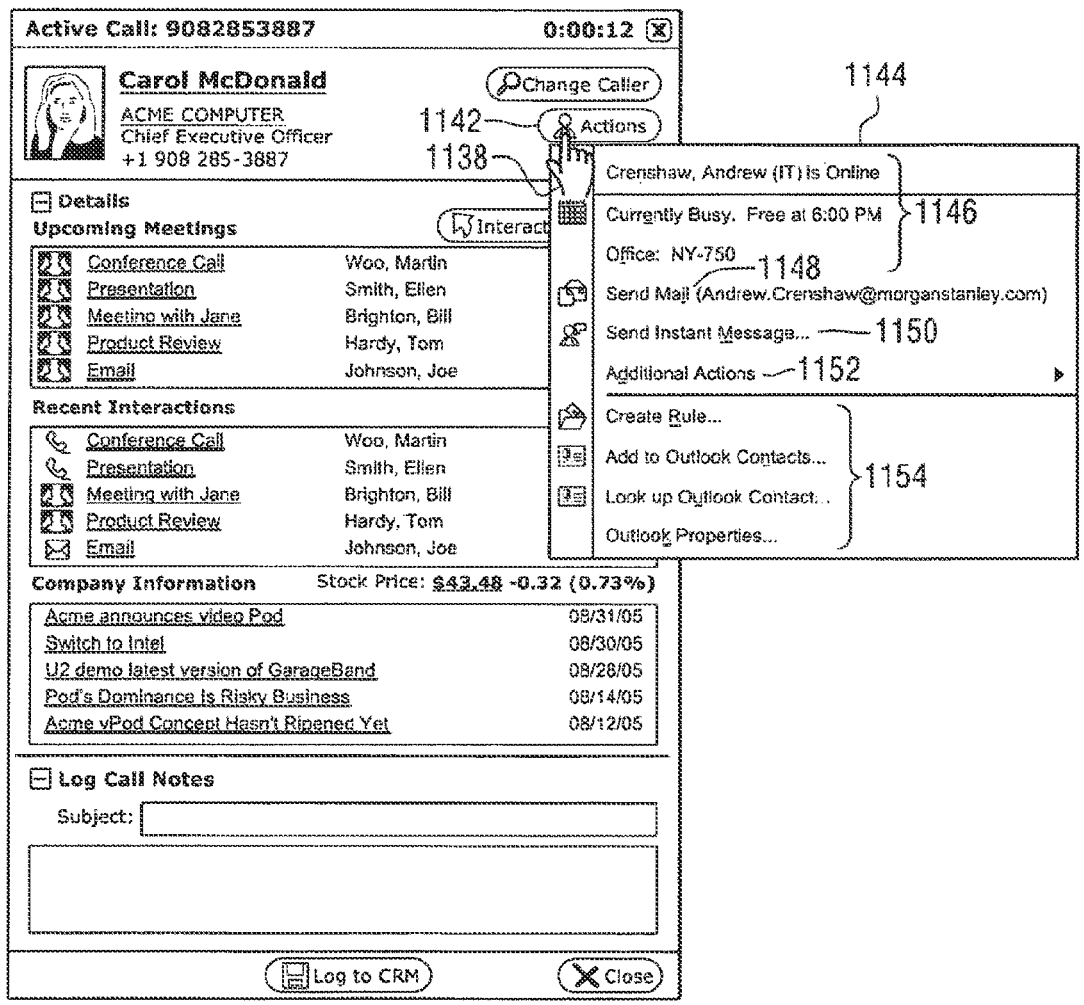
Figure 11G:
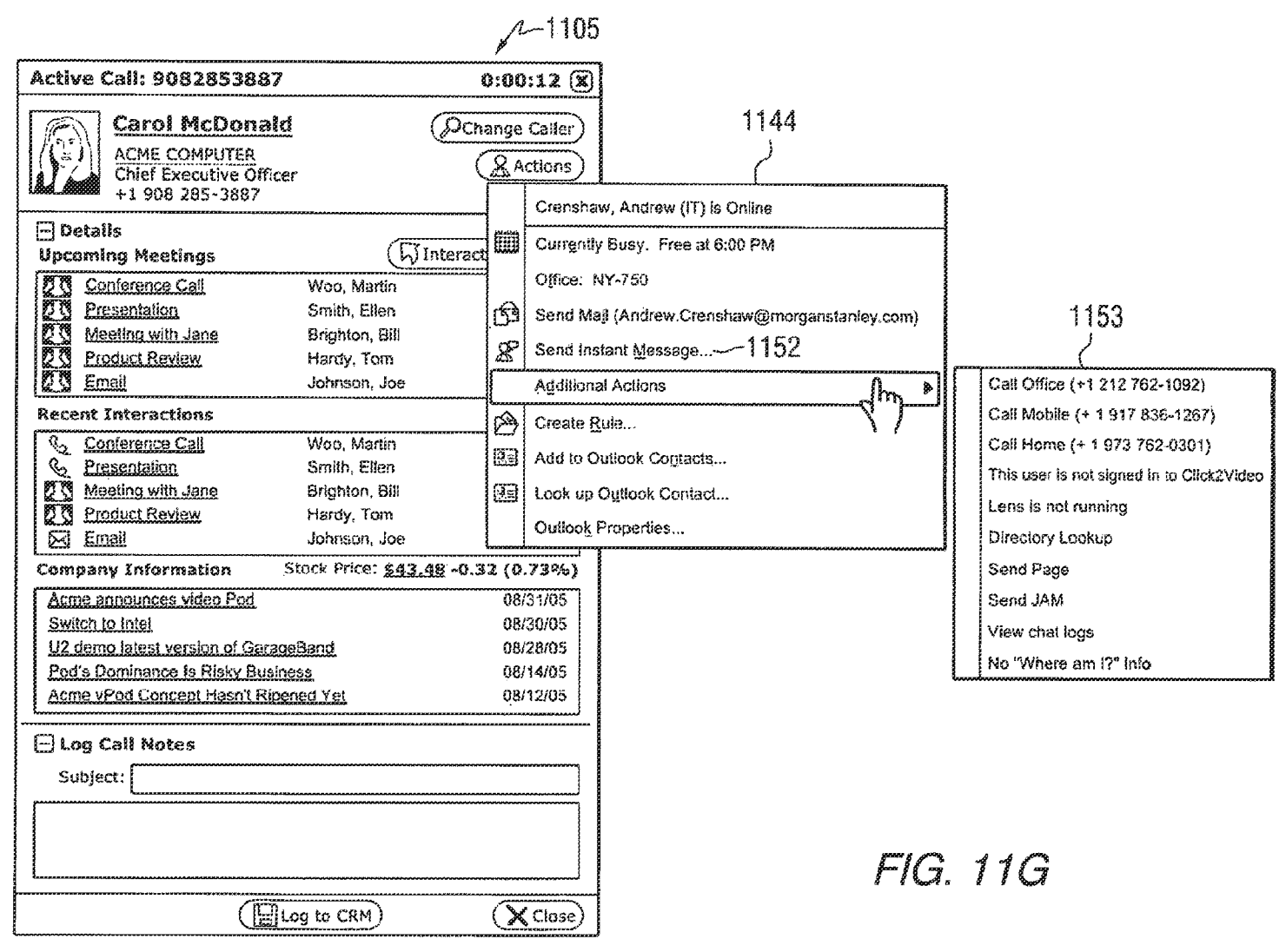

Referring back to FIG. 10, at block 1004, the user may optionally enter notes regarding the call at field 1119. Window 1100 in FIG. 11B shows field 1119 expanded to include a subject field 1136 and a body field 1138. The user may select the fields 1136 and 1138 and type or otherwise record notes regarding the conversation. At decision block 1006, the user may choose to log the call by selecting field 1122. FIG. 11C shows the window 1100 with a cursor 1138 positioned above a Log to CRM field 1122. Selecting the Log to CRM field 1122 may cause information about the call, including any notes recorded at block 1004, to be recorded, for example, to the CRM database 514 at block 1008. FIG. 11C shows window 1100 with fields 1116 and 1119 minimized, however, it will be appreciated that the Log to CRM field 1122 may also be selected when one or both of fields 1116 and 1119 are expanded, as shown in FIG. 11B. FIG. 11D shows the window 1100 with field 1122 indicating that a logging procedure is in progress. FIG. 11E shows the window 1100 after the call has been logged. Field 1140 may display a log date stamp indicating to the user that the call has been logged and showing a date and time when the call was logged.

Referring back to FIG. 10, at block 1010, the user may perform additional operations. For example, referring to FIG. 11B, the user may change the selected caller by activating field 1118. It may be desirable to change the selected caller in situations where the listed caller is not the person to whom the user is speaking. This may occur if the caller was misidentified or is calling from a different line than usual. The user may also e-mail the caller by selecting box 1122. In window 1105, shown in FIG. 11F, the cursor 1138 is shown over an Actions field 1142, displaying an additional field 1144 that provides the user with information and a list of other available actions. For example, field 1146 displays information regarding the user. Selecting field 1148 may send an e-mail to the user. Selecting field 1150 may allow the user to select an instant message. The instant message may be prepared and sent according to any known program or protocol including, for example, MICROSOFT MESSENGER, AOL INSTANT MESSENGER, YAHOO MESSENGER, etc. Field 1154 may allow the user to add or coordinate contact information about the caller with a computerized address book. For example, the user may add the caller to the address book, update an existing entry for the caller in the address book, create a rule regarding contacts with the caller, etc. The computerized address book may be any kind of address book implemented on a computer including, for example, the MS OUTLOOK product available from MICROSOFT.

A field 1152 shown in field 1144 may provide the user with still more additional actions and information. Selecting field 1152 may display field 1153 including various sub-fields. For example, the user may dial an additional phone number by selecting one of sub-fields 1156, 1158, 1160. This may allow the user to "conference" the new number into the existing phone call. Referring back to FIG. 10, the user may terminate the call at step 1016. The call may be terminated in any way. For example, the user may transfer the call to voicemail, place the call on hold, conference the call with another individual, and/or hang up.

Figure 12:
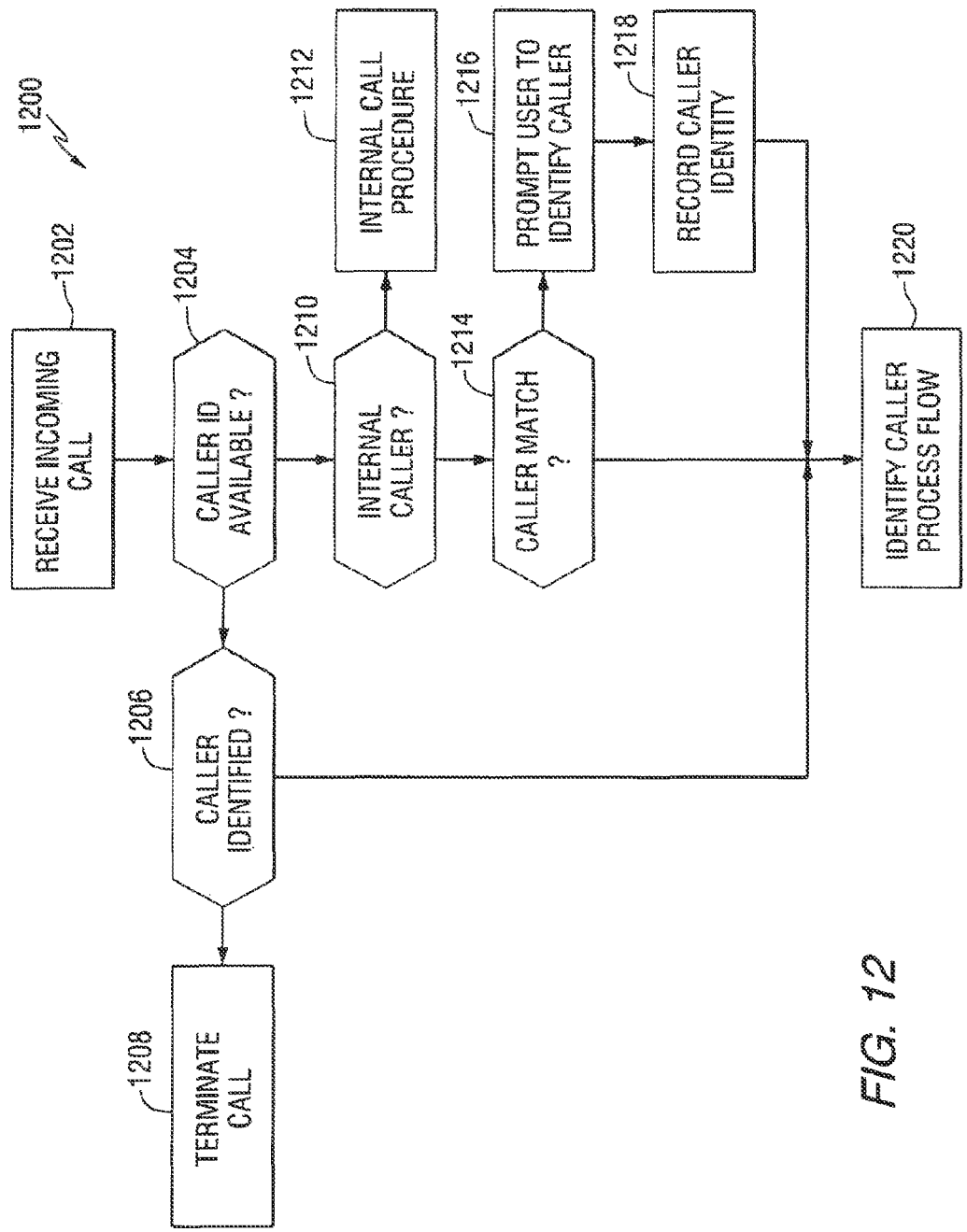
FIG. 12 shows a flow chart illustrating a process flow according to various embodiments.

For the process flow 1000, it is assumed that the caller's identity is predetermined. Various embodiments of the invention, however, may identify the caller, for example, automatically or based on input from the user. FIG. 12 shows a process flow 1200 illustrating a process for identifying a caller according to various embodiments. At step 1202, an incoming call may be received. At decision block 1204, it may be determined whether caller ID is available for the call. If caller ID is not available, the user may be prompted to identify the call at box 1206, for example, based on the caller's voice, or verbal self-identification.

Figure 13A:
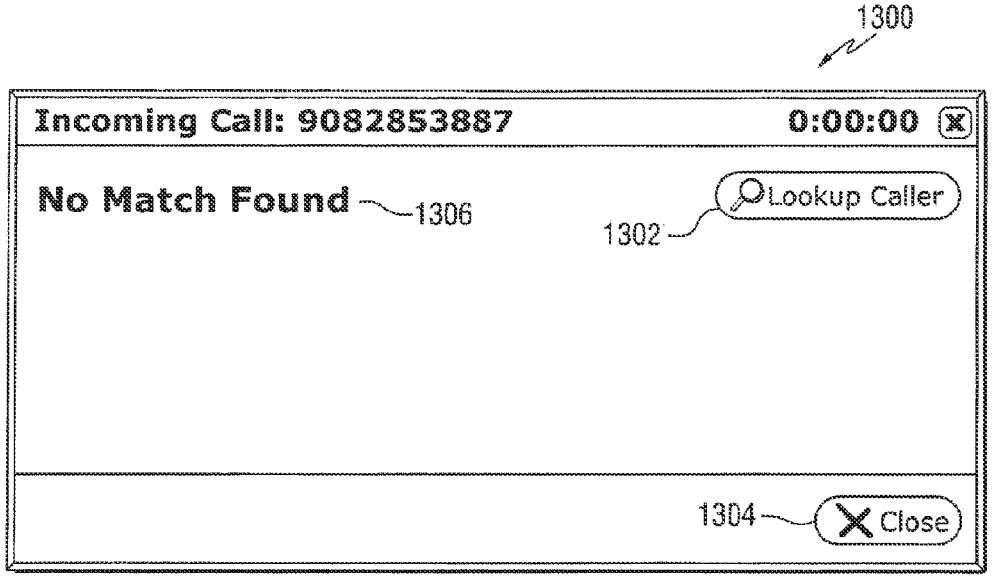
FIGS. 13A-13B are screen shots illustrating various user interfaces according to various embodiments.
Figure 13B:
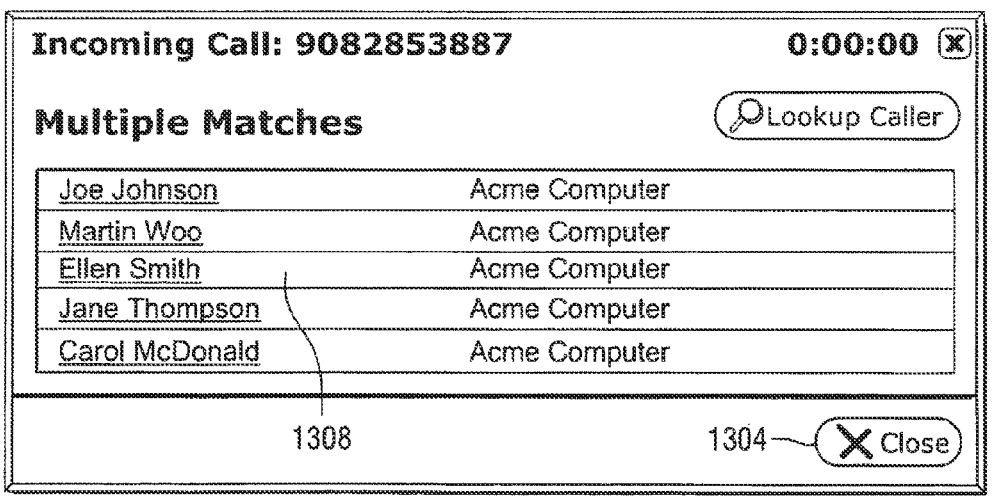

FIG. 13A shows a screen shot of a window 1300 from a user interface that may be served to the user prompting the user to identify the caller. In various embodiments, the window 1300 may be presented to the user as a screen pop. The user may activate button 1302 to select the caller from a list of potential contacts, for example, provided by a CRM database as described in more detail below. In various embodiments, the list of potential contacts may be screened and/or organized based on entries in a computerized address book. If the caller cannot be identified, the call may be terminated at block 1208 in any way, for example, as described above with reference to block 1012 of process flow 100. If the caller is identified, then the process flow may proceed to an identified caller process flow at block 1220, such as process flow 1000 described above.

Referring back to FIG. 12, if caller ID is available, it may be determined whether the caller is an internal caller at decision block 1210. For example, a caller who is also an employee of the firm may be an internal caller. If the caller is an internal caller, the process flow may proceed to an internal call procedure at step 1212. The internal call procedure may be determined by the firm. For example, the firm may implement an internal call procedure similar to the identified caller process flow 1000 shown in FIG. 10. In various embodiments, the firm may not track internal calls at all. In one non-limiting embodiment, the firm may track some aspects of internal calls, but not to the extent of process flow 1000.

If it is determined at decision block 1210 that the caller is not internal, the identity of the caller may be sought at decision block 1214. For example, the caller's telephone number may be cross-referenced with a list of potential callers and telephone numbers included in a CRM database 514. In one non-limiting embodiment, the list of potential callers may be screened according to entries in the user's computerized address book. If one match for the caller's number is found at block 1214, then the process flow 1200 may proceed to the identified caller process flow at block 1220. If no match, or multiple matches, for the caller's number are found at block 1214, then user may be prompted to identify the caller's identity at block 1216.

When no matches are found, the user may be shown window 1300 of FIG. 13A and invited to activate field 1302 to select the caller from a list of potential callers, for example, included in the CRM database 514. In various embodiments, the list of potential callers included in field 1302 may be screened and or organized based on the user's computerized address book. It will be appreciated that the caller may be unidentified, yet present in the database, for example, if the caller is not calling from his or her normal telephone, e.g. a hotel phone, a different extension, etc. If multiple matches are found between the caller's number and entries in the CRM database, then the user may be shown window 1301 of FIG. 4B. There may be multiple matches, for example, if the caller's company broadcasts only one or a few trunk numbers on caller ID without displaying specific extensions. The user may select the correct caller from the list shown in field 1308. The callers listed in field 1308 may, in one non-limiting embodiment, be screened and/or organized based on the user's computerized address book. When the correct caller identity is selected, it may be recorded to the database at step 1318. The process flow 1200 may then proceed to the identified caller process flow at step 1220.

Various embodiments of the present invention may provide support for the user's administrative assistant. For example, when the user receives a call, his or her administrative assistant may be able to view the identity of the caller and some information regarding the caller and the caller's company. The administrative assistant may also be able to message the user during a call. Also, if the user is away from his or her desk, the administrative assistant may be able to answer the call and prepare a message to the user including information about the caller, etc.

Figure 14:
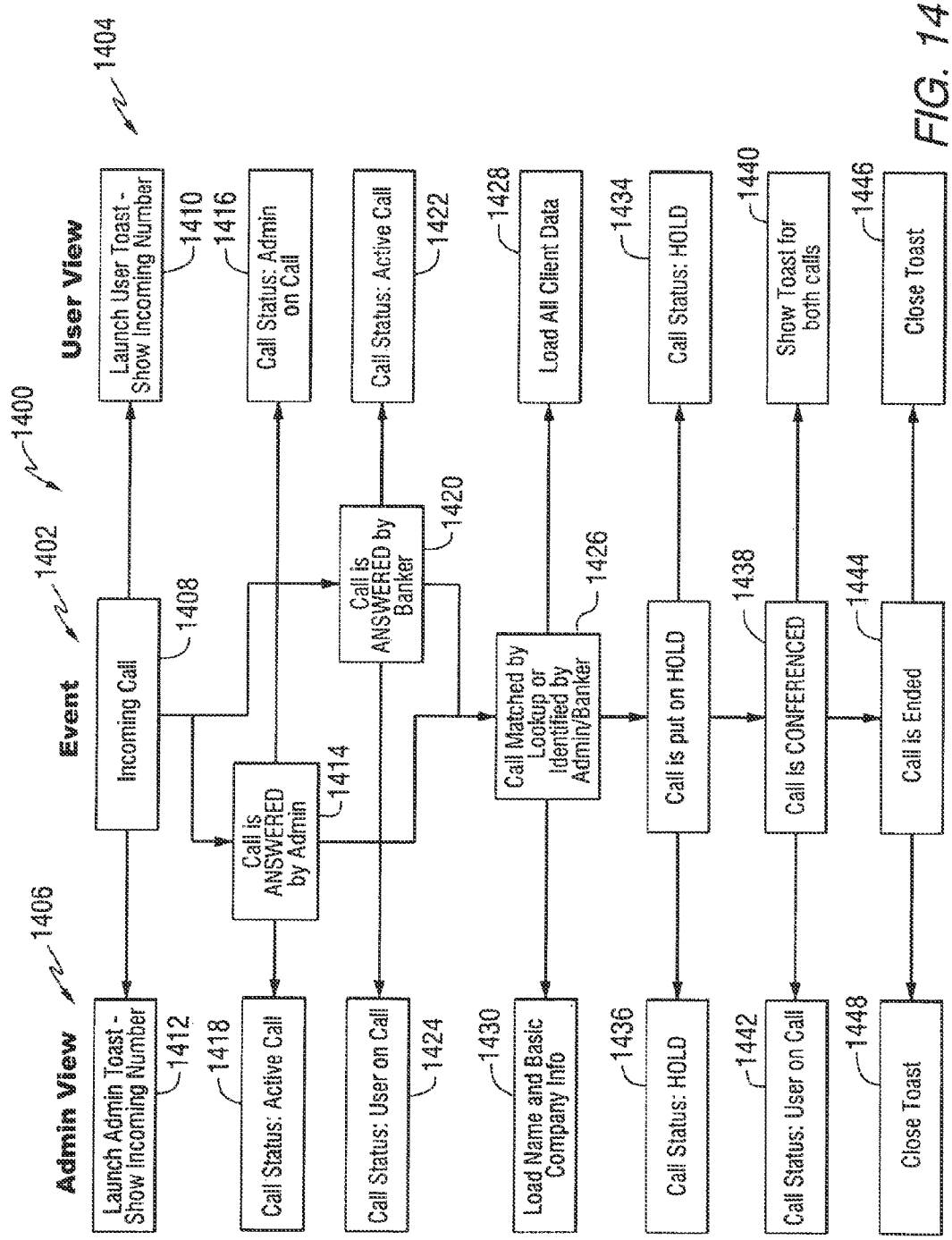
FIG. 14 shows a chart illustrating a work flow according to various embodiments.

FIG. 14 is a workflow diagram 1400 showing various events and the view provided to the user and the administrative assistant for each event. For example, column 1402 shows a listing of possible events during the course of a call. Column 1404 details the users view during each of the events listed in column 1402 and column 1406 details the administrative assistant's view during each of the events listed in column 1406. The views described in columns 1404 and 1406 may be presented to the user and administrative assistant according to any suitable method, for example, as windows on a screen of a computer. In one non-limiting embodiment, the views may be presented as a screen pop.

At event 1408, an incoming call is received. As shown at boxes 1410 and 1412, the user and administrative assistant both may be shown a window indicating that a call is incoming and showing the caller's number, if available. At box 1414, the administrative assistant may answer the telephone call, for example, if the user is unavailable or is screening calls. The user may be shown a window indicating that the administrative assistant has answered the call at box 1416, while the administrative assistant may be shown a window indicating that he or she is in an active call at box 1418. If the user answers the call, at box 1420, the user may be shown an active call window at box 1422 while the administrative assistant may be shown a window indicating that the user is on the call at box 1424.

At event 1426, the caller may be identified, for example, according to any of the methods described above. In various non-limiting embodiments, the caller's number may be automatically matched to a CRM database. In other non-limiting embodiments, the caller may be identified by the user and/or the administrative assistant. When the caller is identified, the user may be shown available data about the customer at box 1428. For example, the user may be shown any one of windows 1200, 1300, 1301, etc. At the same time, the user's administrative assistant may be provided with similar call information at box 1430. The call information shown to the administrative assistant may be less than all of the information about the caller and call shown to the user. For example, the administrative assistant may only be shown the caller's name and basic information about the caller's company. In various non-limiting embodiments, however, the administrative assistant may be shown information identical to the information shown to the user.

At event 1432, the call may be put on hold by either the user or the administrative assistant. At that point, the user and the administrative assistant both may be shown windows indicating that the call is on hold at boxes 1434 and 1436. At event 1438, the call may be conferenced by the user. The user may see one or more windows, showing information for both the original call and the new conference call at box 1440. The administrative assistant may be shown a window indicated that the user is on the call at box 1442. It will be appreciated that in various embodiments, the administrative assistant may conference the call. At event 1444 the call may be terminated, for example, by hanging up, forwarding the caller to voicemail, transferring the call, etc. A screen pop, or windows, relating to the call then open on the user and administrative assistant's desk may be closed at boxes 1446 and 1448.

Figure 15:
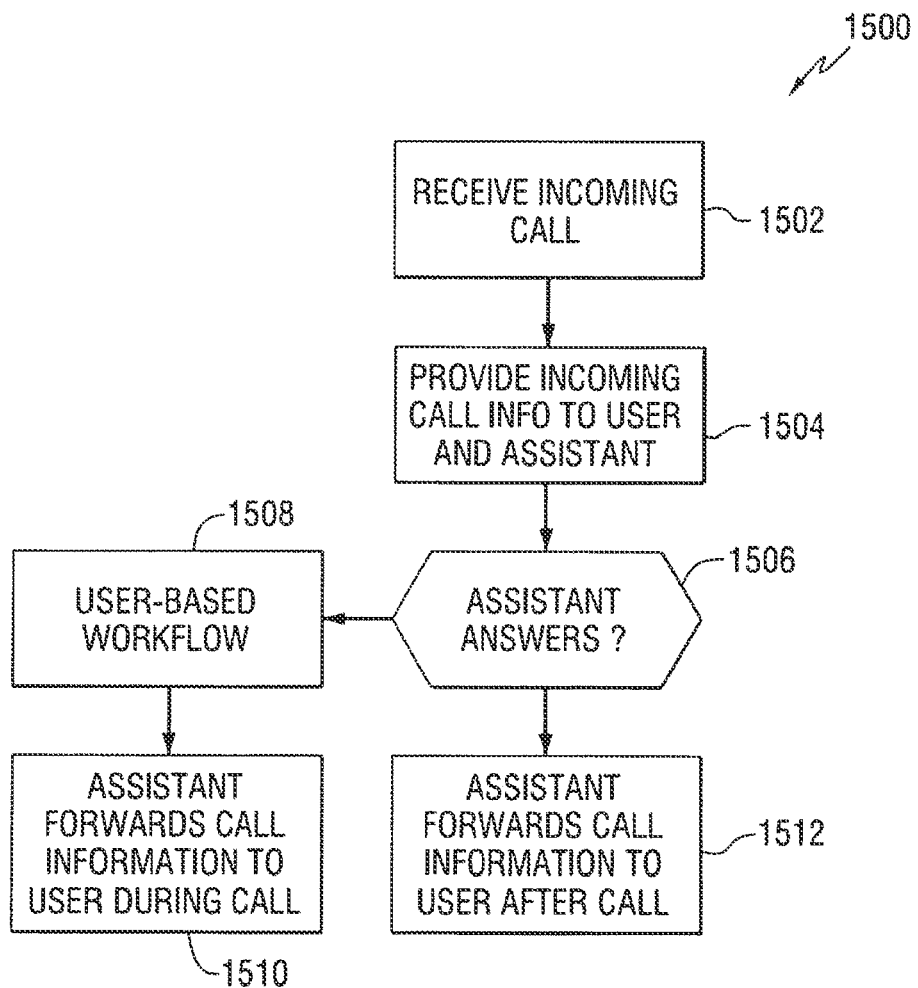
FIG. 15 shows a flow chart illustrating a process flow according to various embodiments.

FIG. 15 shows a process flow 1500 for allowing an administrative assistant to answer a call according to various at embodiments. At box 1502, an incoming call may be received. At box 1504, incoming call information may be provided to the user and administrative assistant, for example, as discussed with respect to event 1426 above. If the user answers the phone at decision block 1506, then the process flow 1500 may implement a user-based identified caller process flow, for example, as shown above in FIG. 10. It will be appreciated that the administrative assistant may be able to message call information to the user while the user is on the call at box 1510. For example, the administrative assistant may use an instant message to inform the user that he or she has another call, a visitor, etc. The instant message may appear to the user as a window, for example, as toast or a screen pop.

If the administrative assistant answers the call at decision box 1506, then the administrative assistant may be presented with a window, e.g., a screen pop, for preparing a message for the user. The window may include a template having fields listing the caller, the caller's company, the time of the call, and other information. One or more of these fields may be populated automatically. The window may also include one or more fields for the administrative assistant to include additional comments. After the administrative assistant completes the template window, it may be forwarded to the user. For example, the template may be sent as an instant message. In another non-limiting embodiment, the template may be sent to the user via e-mail.

As used herein, a "computer" or "computer system" may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereof, and/or any other computerized device capable of configuration for processing data for standalone application and/or over a networked medium or media. Computers and computer systems disclosed herein may include operatively associated memory for storing certain software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, ROM (read only memory), RAM (random access memory), PROM (programmable ROM), EEPROM (extended erasable PROM), and/or other like computer-readable media.

While several embodiments of the invention have been described, it should be apparent that various modifications, alterations and adaptations to those embodiments may occur to persons skilled in the art with the attainment of some or all of the advantages of the present invention. For example, the various modules described herein may be arranged in a different spatial configuration, or may be included in separate interfaces according to various embodiments. It is therefore intended to cover all such modifications, alterations and adaptations without departing from the scope and spirit of the present invention as defined by the appended claims.

We claim:

1. A computer implemented system for presenting a user interface to a user, the system comprising:
   a computer comprising at least one processor and operatively associated non-transitory memory, wherein the memory comprises thereon instructions that, when executed by the at least one processor, cause the at least one processor to:
   serve a user interface to a user system, wherein the user interface comprises a plurality of company tiles, wherein each of the plurality of company tiles comprises an indicator of a corresponding company and wherein each of the plurality of company tiles comprises a state indicating a property of the corresponding company;
   receive from the user system a selection of a first company tile selected from the plurality of company tiles;
   in response to the selection, serve to the user system a second user interface, wherein the corresponding company of the first company tile is a subject company of the second user interface, and wherein the second user interface comprises:
      a subject company tile comprising an indicator of the subject company, wherein a state of the company tile indicates a property of the subject company;
      a subject individual module displaying information regarding a subject individual related to the subject company; and
      a navigation toolbar including a second company tile comprising an indicator of a second company, wherein selecting the second company tile causes the second company to become a new subject company of the second user interface.

2. The system of claim 1, wherein the second company is related to the subject company.

3. The system of claim 2, wherein the second company is at least one of the group consisting of, a subsidiary of the subject company, a parent of the subject company, a strategic partner of the subject company, and a competitor of the subject company.

4. The system of claim 1, wherein the second company is a previous subject company of the user interface.

5. The system of claim 1, wherein the second company tile indicates a property of the second company.

6. The system of claim 1, wherein the property of the subject company comprises at least one property selected from the group consisting of a share price, a change in share price, a status of an earnings report for the subject company, a status of a research report regarding the subject company, and a status of a news story regarding the subject company.

7. The system of claim 1, wherein the second user interface further comprises a calendar module including information regarding meetings with at least one of the subject individual and another individual related to the subject company.

8. The system of claim 1, wherein the subject individual is at least one of the group consisting of an employee of the subject company, a representative of the subject company, and an analyst who reports on the subject company.

9. The system of claim 1, wherein the second user interface further comprises a subject individual navigation module comprising a plurality of names, wherein each name indicates an individual related to the subject company, and wherein selecting one of the names causes the individual indicated by the name to become a new subject individual.

10. The system of claim 1, wherein the second user interface further comprises an analyst rating module, wherein the analyst rating module provides a rating of the subject company.

11. The system of claim 1, wherein the second user interface further comprises a deal track module, wherein the deal track module provides information regarding pending deals of the subject company.

12. The system of claim 11, wherein the information regarding pending deals comprises at least one of the group consisting of a deal description or name, a product phase, a size, and a probability of completion.

13. The system of claim 1, wherein the second user interface further comprises a relationship module, wherein the relationship module graphically displays a relationship between the subject individual and a second individual related to the subject company.

14. The system of claim 1, wherein the memory further comprises thereon instructions that, when executed by the at least one processor, cause the computer to serve to the user system an alert window, wherein the alert window is configured to display when at least one predetermined condition is met.

15. The user interface of claim 14, wherein the memory further comprises thereon instructions that, when executed by the at least one processor, cause the computer to display the alert window on top of the second user interface.

16. A computer-implemented method of providing information regarding a subject company to a user, the method comprising:
   serving, by a computer and to a user system, a user interface, wherein the user interface comprises a plurality of company tiles, wherein each of the plurality of company tiles comprises an indicator of a corresponding company, wherein each of the plurality of company tiles comprises a state indicating a property of the corresponding company, and wherein the computer comprises at least one processor and operatively associated non-transitory memory;
   receiving, by the computer and from the user system, a selection of a first company tile selected from the plurality of company tiles;
   in response to the selection, serving, by the computer and to the user system, a second user interface, wherein the corresponding company of the first company tile is a subject company of the second user interface, and wherein the second user interface comprises:
      a subject company tile comprising an indicator of the subject company, wherein a state of the company tile indicates a property of the subject company;
      a subject individual module displaying information regarding a subject individual related to the subject company; and
      a navigation toolbar including a second company tile comprising an indicator of a second company, wherein selecting the second company tile causes the second company to become a new subject company of the second user interface.

17. The system of claim 14, wherein the at least one predetermined condition is a phone call with an individual from the subject company.

18. A computer implemented system for presenting a user interface to a user, the system comprising:
- a computer comprising at least one processor and operatively associated non-transitory memory, wherein the memory comprises thereon instructions that, when executed by the at least one processor, cause the at least one processor to:
  - receive an indication of an incoming communication event from a subject individual to a user of a user system;
  - in response to the indication of the incoming communication, serve to the user system a user interface, wherein the user interface comprises:
    - a subject individual module displaying information regarding the subject individual; and
    - a subject company tile comprising an indicator of a subject company, wherein the subject company is associated with the subject individual, and wherein a state of the company tile indicates a property of the subject company.

19. The system of claim 18, wherein the user interface further comprises a navigation toolbar including a second company tile comprising an indicator of a second company, wherein selecting the second company tile causes the second company to become a new subject company of the second user interface.

20. The system of claim 19, wherein the second company is related to the subject company.

21. The system of claim 19, wherein the property of the subject company comprises at least one property selected from the group consisting of a share price, a change in share price, a status of an earnings report for the subject company, a status of a research report regarding the subject company, and a status of a news story regarding the subject company.

22. The system of claim 19, wherein the second user interface further comprises a calendar module including information regarding meetings with at least one of the subject individual and another individual related to the subject company.

23. The system of claim 19, wherein the subject individual is at least one of the group consisting of an employee of the subject company, a representative of the subject company, and an analyst who reports on the subject company.

24. The system of claim 19, wherein the second user interface further comprises a relationship module, wherein the relationship module graphically displays a relationship between the subject individual and a second individual related to the subject company.

* * * * *